US005792970A

United States Patent [19]

Mizobata

[11] Patent Number: 5,792,970

[45] Date of Patent: Aug. 11, 1998

[54] DATA SAMPLE SERIES ACCESS APPARATUS USING INTERPOLATION TO AVOID PROBLEMS DUE TO DATA SAMPLE ACCESS DELAY

[75] Inventor: Norihiko Mizobata, Habikino, Japan

[73] Assignee: Matsushita Electric Industrial Co., Ltd., Kadoma, Japan

[21] Appl. No.: 453,205

[22] Filed: May 30, 1995

[30] Foreign Application Priority Data

Jun. 2, 1994 [JP] Japan .................................... 6-121208

[51] Int. Cl.[6] .................................. G06F 7/38; G10H 7/12

[52] U.S. Cl. ............................................... 84/607; 364/723

[58] Field of Search ...................... 84/603–607; 364/723, 364/724.1

[56] References Cited

U.S. PATENT DOCUMENTS

| | | | |
|---|---|---|---|
| 4,612,838 | 9/1986 | Nagashima et al. | 84/607 |
| 4,788,528 | 11/1988 | Elmqvist | 364/723 X |
| 5,054,358 | 10/1991 | Usami | 84/607 X |
| 5,111,727 | 5/1992 | Rossum | 84/603 |
| 5,146,834 | 9/1992 | Izumisawa et al. | 84/607 |
| 5,149,902 | 9/1992 | Washiyama | 364/723 X |
| 5,175,701 | 12/1992 | Newman et al. | 364/723 |
| 5,258,938 | 11/1993 | Akamatsu | 364/723 |
| 5,290,965 | 3/1994 | Yoshida et al. | 364/723 X |
| 5,340,938 | 8/1994 | Sugita et al. | 84/605 |
| 5,351,087 | 9/1994 | Christopher et al. | 364/723 X |
| 5,379,241 | 1/1995 | Greggain | 364/723 |

*Primary Examiner*—Stanley J. Witkowski
*Attorney, Agent, or Firm*—Renner, Otto, Boisselle & Sklar, P.L.L.

[57] ABSTRACT

A data sample series access system including an interpolating section for obtaining, by interpolation, sound data at a timing indicated by a sound interpolation timing signal by using at least two adjacent sound data signals, and a selecting section for outputting the sample of sound data as a sound output signal at a timing indicated by a sound output timing signal. The data sample series access system avoids problems caused by a delay in memory access operations of the sound data.

18 Claims, 17 Drawing Sheets

DATA SAMPLE SERIES ACCESS APPARATUS USING INTERPOLATION TO AVOID PROBLEMS DUE TO DATA SAMPLE ACCESS DELAY

BACKGROUND OF THE INVENTION

1. Field of the Invention

The present invention relates to an apparatus for reading sound data which has been sampled and stored in a memory. More particularly, the present invention relates to a sound data access apparatus capable of performing, simultaneously with the reading of sound data, musical interval conversion of the sound data and conversion of the sampling rate.

2. Description of the Related Art

In recent years, multi-media equipment such as personal computers and game machines have become capable of handling digital sound data, and the sound processing ability thereof is also enhanced.

Sound processing in such multi-media equipment is classified as follows:

(1) Reading of sound data from a memory, (2) Conversion of the sampling rate and/or musical interval, (3) Acoustic processing such as addition of echo/reverberation, (4) Mixing, and (5) Coding/Decoding.

Such processing is mainly performed in a dedicated circuit in an electronic musical instrument, and is performed in a digital signal processor (DSP) in a multi-media personal computer and a game machine. The performance of DSP is being remarkably developed, so that DSP's which can perform various kinds of processing in accordance with programs will be promisingly used in many applications.

With the development of the performance of DSP, the required contents of processing and the required amount of processing are drastically increased. For example, as for an electronic musical instrument, in order to produce the sound of a musical instrument, the musical interval conversion processing and the echo/reverberation processing are performed for sampling data of about 30 channels, and then the mixing is performed. As a coding method for sound data, a coding method such as MPEG with high data compression efficiency is used in practice, although such a coding requires complicated processing.

In the above-mentioned sound processing, the musical interval conversion and the sampling rate conversion are the versatile processing. The musical interval conversion and the sampling rate conversion will be described below.

The musical interval conversion is performed for the purpose of changing the musical interval of the sampled sound data. For example, in the case where sound data which is obtained by sampling a piano sound "la" of the musical scale is stored in the memory, another sound of the musical scale (e.g., "re" or "mi") is generated from the stored sound data.

The processing in which sound data obtained by sampling a sound of 500 Hz at a sampling rate of 40 kHz is converted into sound data of 400 Hz will be described below.

When the sound of 500 Hz is sampled at 40 kHz, 80 pieces of sampling data are included in one cycle. When a sound of 400 Hz is sampled at 40 kHz, 100 samples are included in one cycle. Accordingly, if 100 samples are obtained by interpolating the samples of sound data of 500 Hz in one cycle, the 100 samples are identical with samples of sound data of 400 Hz sampled at 40 kHz. When the series of obtained samples is reproduced as sound data, after being D/A converted at the sampling rate of 40 kHz, the sound of 400 Hz is reproduced.

Such musical interval conversion is, for example, applied in an electronic musical instrument (e.g., an electronic piano). Recently, an electronic musical instrument can store sound data obtained by sampling real sounds of actual instruments, in order to output the same sounds as those of the actual instruments. By reproducing the stored sound data as sounds in an accompanied manner with the musical performance, the sounds similar to the real sounds of the actual instrument can be reproduced. However, in order to store sound data of all sounds in the musical scale, a memory with a huge capacity is required. Accordingly, such an electronic musical instrument which can store sound data of all sounds in the musical scale cannot be produced in actuality. Therefore, at this time, only sound data of some sounds in the musical scale is stored. In order to reproduce a sound for which the sound data is not stored, the sound is generated by performing the musical interval conversion for the stored sound data, and the generated sound data is reproduced.

For example, U.S. Pat. No. 5,111,727 discloses a digital sampling instrument which performs the musical interval conversion by interpolation of digital sound stored in the memory.

Some recent game machines and personal computers apply a hardware and a software by which the musical play is performed based on the data of a musical score. Such equipment is equipped with a sound generator which holds data of some sounds sampled in the same way as in the electronic musical instrument, and which generates sounds of various musical intervals by performing the musical interval conversion for the held sound data.

Next, the sampling rate conversion will be described. The sampling rate conversion is the process in which the sound data which is sampled at a certain sampling rate is converted into sound data at another sampling rate. For example, in the case where sound data sampled at a sampling rate of 40 kHz by an apparatus including an A/D converter of 40 kHz is reproduced by an apparatus including a D/A converter of 44 kHz, the sound data is required to be converted into data of 44 kHz.

The process in which the sound data obtained by sampling the sound of 500 Hz at 40 kHz is converted into sound data of 500 Hz sampled at 44 kHz will be described below.

If the sampling rate is different between the A/D converter for the sampling and the D/A converter for the reproduction, the sampling rate conversion is required.

When the sound of 500 Hz is sampled at 40 kHz, 80 samples represent a waveform of one cycle. When the sound of 500 Hz is sampled at 44 kHz, 88 samples represent a waveform of one cycle. In order to convert the sound data sampled at 40 kHz into the sound data sampled at 44 kHz, sound data of 88 samples is generated from the sound data of 80 samples. Specifically, the sound data at a point obtained by dividing the waveform of one cycle into 88 equal portions is calculated by interpolation by the use of the 80 samples of sound data representing the waveform of one cycle, so that the sound data of 500 Hz sampled at 40 kHz can be converted into the sound data of 500 Hz sampled at 44 kHz. The converted sound data is reproduced after being D/A converted at a sampling rate of 44 kHz, so that the sound of 500 Hz is output.

The sound data which is now often used is obtained by sampling musical data, sound data of digital communication, and other data at a sampling rate which is optimum to the respective equipment. An exemplary relationship between respective equipment and a sampling rate used therein is shown below.

TABLE 1

| equipment | sampling rate |
|---|---|
| CD (Compact Disc) | 44.1 kHz |
| DAT (Digital Audio Tape) | 48 kHz |
| CD-ROM | 32 kHz,<br>16 kHz,<br>8 kHz, or the like |
| Digital Phone | 8 kHz, or the like |

In recent years, equipment becomes accommodated to multiple media, so that it is necessary for a single apparatus to reproduce a sound obtained from various media. For example, a multi-media personal computer equipped with a communication function and a CD-ROM device must reproduce both sound data at 8 kHz obtained from a digital phone and sound data at 16 kHz or the like obtained from the CD-ROM. However, if reproduction circuits dedicated for respective media are provided in the multi-media personal computer, the size of the whole apparatus is increased, and the price thereof is also increased. Therefore, it is necessary to reproduce sound data of various different kinds of sampling frequencies by a single sound reproduction circuit. As a result, a method for converting the sampling rate of sound data into the sampling rate of the D/A converter provided in the equipment is adopted.

As described above, the musical interval conversion processing is performed by interpolating the sampled sound data for generating sound data between sampling points so as to change the number of samples of the sound data, and by reproducing the resulting data at an original sampling rate.

The sampling rate conversion processing is performed by interpolating the sampled sound data for generating sound data between sampling points so as to change the number of samples of the sound data, and by reproducing the resulting data at another new sampling rate.

As described above, the musical interval conversion processing and the sampling rate conversion processing are different from each other in that the sampling rate during the A/D conversion and the sampling rate during the D/A conversion are the same or different, so that they are regarded as the same processing in terms of the conversion processing.

Hereinafter, various process such as the reading of data from a sound memory and the musical interval conversion in conventional multi-media equipment will be described.

FIG. 16 is a schematic diagram showing a construction for conventional multi-media equipment.

The conventional multi-media equipment includes a central processing unit (CPU), a main memory, a disk device, a sound circuit, and an image display circuit, and they are respectively connected via a bus. The sound circuit includes a sound data buffer circuit, a sound DSP, a memory for DSP, and a sound D/A converter. The image display circuit includes an image memory and a video D/A converter.

The sound circuit is connected to a sound output device, and the image display circuit is connected to a display device.

The case where image data stored in the main memory is displayed on the display device, and at the same time, the sampling rate conversion is performed for sound data stored in the main memory, and then processing in the sound DSP is performed, so that the result is output from the sound output device will be described in detail below.

First, the CPU instructs the sound DSP to perform the sound output and the sound processing. Next, the CPU reads the image data from the main memory, and writes the image data into the image memory of the image display circuit.

At the same time, the sound DSP instructs the sound data buffer circuit to read the sound data from the main memory.

The sound data buffer circuit reads the specified sound data from the main memory, and stores the sound data in a buffer memory.

The sound DSP reads the sound data from the buffer memory of the sound data buffer circuit, and performs the sampling rate conversion in accordance with a DSP program. Then, the sound DSP performs the sound processing in accordance with the DSP program, and outputs the result to the sound D/A converter. The D/A converted sound is output from the sound output device.

On the other hand, the image display circuit sequentially outputs the image data written by the CPU to the video D/A converter, and the D/A converted image is displayed on the display device.

In general, in multi-media personal computers and game machines, various data such as programs, sound data, and image data are stored in one and the same main memory. The main memory, the sound processing circuit, the image display circuit, and the like are connected to a single system bus. Therefore, the reading of data from the main memory is always performed through the system bus. In the multi-media equipment having such a construction, if the display of image data, the reading of programs, and the sound processing are simultaneously performed, or if sound data of a plurality of channels are simultaneously read from the main memory, the reading operation of data is concentrically performed to the main memory. As a result, collision is caused, which results in a waiting time for reading the data. In other words, there occurs a delay in memory access. The musical interval conversion and the sampling rate conversion of sound are performed by interpolation using adjacent sound data. For this reason, if the reading of data is delayed, the interpolation cannot be performed and an erroneous result is obtained.

Therefore, the conventional sound processing circuit is provided with a first-in first-out (FIFO) memory (buffer memory) for each sound channel, so that the sound data is previously read from the main memory, and stored in the buffer memory of the sound processing circuit. By such a method, it is possible to read the sound data from the FIFO memory and perform the processing at a timing required by the sound processing circuit for each channel.

However, in the case where a sound processing in which the sound data of about 30 channels are simultaneously processed to be performed, it is necessary to provide a buffer for each channel. This results in a problem of the capacity of the buffer memory. In recent years, the components including the DSP and the buffer memory which constitute the sound processing circuit are installed in one LSI, so that it is desired to reduce the capacity of the buffer memory in order to reduce the size and the price of the LSI.

The problem in the case where a delay of memory access occurs in the conventional multi-media equipment will be described in more detail.

The operation and problem in the case where the delay of memory access occurs in equipment which is not provided with the FIFO memory are first described.

It is assumed that the sound data sample series as shown by a solid line in the bar graph of FIG. 9 is stored in the memory. In order to convert the sampling rate of the sound data sample series, the sample D6 (indicated by a broken line in the bar graph) at time T6 is obtained. In such a case, the sample D2 at time T2 is read from the memory. In order to obtain the sample D6 at time T6, the sample D3 at time T3 is read and the operation is performed in accordance with the following equation.

$$D6 = \frac{D2(T3 - T6) + D3(T6 - T2)}{T3 - T2} \quad \text{(Equation 1)}$$

As shown in FIG. 10, when the delay of memory access occurs, it is necessary that the result of the sampling rate conversion should be obtained in a synchronous manner with the timing after the sampling rate conversion. Therefore, the operation of Equation 1 must be performed even if the sample D3 at time T3 is not obtained. In such a case, the sample D2 is used instead of the sample D3. As a result, the sample D6 becomes equal to the sample D2. That is, the obtained result is erroneous.

For the above-mentioned reasons, an FIFO memory is conventionally provided before the sound processing circuit for compensating for the delay of the memory access. A plurality of samples of sound data are previously read so that they can be immediately read when they are required for the operation of Equation 1. However, such FIFO memories are provided respectively for sound data of a plurality of channels, and hence the memory capacity is increased. The increase of memory capacity may be a serious problem when a processing unit for the musical interval conversion and sampling rate conversion is realized as an LSI.

Such problems, regarding with the interpolation and the delay of memory access, are common in the case of reading samples which are obtained by sampling any kind of analog data.

In this invention, interpolation between successively adjacent samples of sound data is performed at a frequency which is higher than the reading frequency of sound data from the memory or the output frequency from the sound data access device, and a data sample which is required as the output is selected and output among the interpolated samples of sound data. Thus, the musical interval conversion and the sampling rate conversion are performed. When new sound data is not entered, the interpolation is continuously performed, whereby the interpolated result at the present time can be predicted by extrapolation on the basis of the sound data which is previously read. Therefore, even when the memory access of sound memory is delayed and hence the entry of sound data is delayed, the sound data which is obtained by this prediction can be output. In a sound signal, generally, a data value of the lower frequency component is larger than a data value of the higher frequency component. That is, sound data in units of sampling data samples are not drastically varied, so that there are few cases in which the sound data obtained by extrapolation is largely different from the actual sound data.

SUMMARY OF THE INVENTION

The sound data access apparatus of this invention comprising:

a sound memory for storing sound data which is sampled and digitized, for receiving a sound address signal, and for outputting sound data stored at an address indicated by the sound address signal, as a sound data signal;

timing generating means for generating an access timing at which the sound memory is to be accessed, for outputting a sound access timing signal indicating the access timing, for outputting a sound interpolation timing signal having a rate obtained by multiplying the rate of the sound access timing signal by a real number, for generating an output timing at which a sound is to be output, and for outputting a sound output timing signal indicating the output timing;

address generating means for receiving the sound access timing signal, for generating an address used for reading the sound data from the sound memory in a synchronous manner with the sound access timing signal, and for outputting a sound address signal indicating the address to the sound memory; and data interpolating and selecting means for receiving the sound interpolation timing signal, the sound output timing signal, and the sound data signal, and for outputting a sound output signal, wherein the data interpolating and selecting means includes:

an interpolating section for obtaining, by interpolation, sound data at a timing indicated by the sound interpolation timing signal by using at least two adjacent sound data signals, and a selecting section for outputting the sample of sound data as a sound output signal at a timing indicated by the sound output timing signal.

In one embodiment, the sound memory additionally outputs a sound data effective signal indicating a timing at which the sound data signal is output, and the data interpolating and selecting means further receive the sound data effective signal, and read the sound data signal in a synchronous manner with the sound data effective signal.

In another embodiment, the interpolating section includes:

a sound register for storing the sound data signal and for outputting data indicated by the sound data signal as an input sound signal;

a cumulative sound register for storing and holding an interpolated sound signal, and for outputting data indicated by the interpolated sound signal as a cumulative sound signal;

sound difference calculating means for obtaining a difference between the input sound signal and the cumulative sound signal and multiplying the difference by 1/n, n being a real number, and for outputting the resulting data as a sound difference signal; and accumulating means for receiving the sound difference signal, for obtaining an accumulation of sound difference data indicated by the sound difference signal, and for outputting the accumulated result as an interpolated sound signal, and wherein the selecting section includes: an output register for storing the interpolated sound signal at a timing indicated by the sound output timing signal, and for outputting data indicated by the interpolated sound signal as the sound output signal.

In still another embodiment, the interpolating section includes:

a sound register for storing the sound data signal at a timing indicated by the sound data effective signal and for outputting data indicated by the sound data signal as an input sound signal;

a cumulative sound register for storing at a timing indicated by the sound data effective signal and holding an interpolated sound signal, and for outputting data indicated by the interpolated sound signal as a cumulative sound signal;

sound difference calculating means for obtaining a difference between the input sound signal and the cumulative sound signal and multiplying the difference by 1/n, n being a real number, and for outputting the resulting data as a sound difference signal; and accumulating means for receiving the sound difference signal, for obtaining an accumulation of sound difference data indicated by the sound difference signal, and for outputting the accumulated result as an interpolated sound signal, and wherein the selecting section includes: an output register for storing the interpolated sound signal at a timing indicated by the sound output timing signal, and for outputting data indicated by the interpolated sound signal as the sound output signal.

In still another embodiment, the timing generating means outputs the sound interpolation timing signal having a rate obtained by multiplying the rate of the sound access timing signal by a power of 2, the power of 2 being represented as $2^m$, m being 1 or more, and the sound difference calculating means shifts the difference between the input sound signal and the cumulative sound signal to the right by m bits, so as to obtain a value multiplied by $1/(2^m)$, and outputs the result as the sound difference signal.

In still another embodiment, the timing generating means outputs the sound interpolation timing signal having a rate obtained by multiplying a rate of the sound access timing signal by a power of 2, the power of 2 being represented as $2^m$, m being 1 or more, and the sound difference calculating means shifts the difference between the input sound signal and the cumulative sound signal to the right by m bits, so as to obtain a value multiplied by $1/(2^m)$, and outputs the result as the sound difference signal.

In still another embodiment, the timing generating means generates a plurality of sound output timing signal series, and outputs a plurality of sound output signal series in a synchronous manner with the plurality of sound output timing signal series respectively.

In still another embodiment, the data interpolating and selecting means includes a plurality of selecting sections which corresponding to the plurality of sound output timing signal series respectively, whereby the plurality of sound output signal series can be simultaneously generated.

In still another embodiment, the data interpolating and selecting means includes a plurality of interpolating sections and a plurality of selecting sections corresponding to the plurality of the sound output timing signal series, whereby the plurality of sound output signal series can be simultaneously generated.

In still another embodiment, the sound data access apparatus further comprising a plurality of output storage means, wherein the data interpolating and selecting means for outputting a plurality of the sound output signal series by performing time-sharing processing, the timing generating means output a plurality of output stored timing signal series, each of the plurality of the output storage means for receiving the sound output signal and outputting stored timing signal which correspond to the output stored means respectively, for storing the sound output signal, and for outputting the stored the sound output signal in a synchronous manner with the output stored timing signal.

Alternatively, the data sample series interpolating apparatus of the invention comprises: interpolating means for interpolating a received first data sample series, so as to generate a second data sample series with sampling intervals which are more narrow than those of the first data sample series, and for outputting the second data sample series;

selecting means for receiving the second data sample series, for selecting data sample with predetermined sampling intervals from the second data sample series, and for outputting the selected data sample as a third data sample series;

In one embodiment, the sampling intervals of the second data sample series are equal to each other.

In another embodiment, the sampling intervals of the second data sample series are real multiple of the sampling intervals of the first data sample series.

In still another embodiment, the interpolating means interpolate the received first data sample series by using two adjacent data samples, obtaining a data sample of the second data sample series continuously, when a data sample of the first data sample series for interpolation can not receive at the necessary timing, the interpolating means extrapolate by using two adjacent data samples previously obtained, whereby the second data sample series can be output without a delay.

In still another embodiment, the selecting means includes a plurality of selecting sections, each of the selecting sections generating the third data sample series from the second data sample series.

In still another embodiment, a plurality of third data sample series are generated from the second data sample series, by performing time-sharing processing in the interpolating means and the selecting means.

Alternatively, the data sample series access apparatus of this invention comprises:

a memory storing a first data sample series, receiving an address signal, outputting a data sample stored at an address indicated by the address signal;

address generating means for generating and outputting the address signal;

timing generating means for generating and outputting an access timing signal indicating a timing at which the memory is to be accessed, an interpolation timing signal indicating a timing at which an interpolation operation is to be performed, and a data output timing signal for selecting data from interpolated data; and data interpolating and selecting means for receiving the first data sample series from the memory, for performing an interpolation operation of the first data sample series in a synchronous manner with the interpolation timing signal, so as to generate a second data sample series, and for selecting the second data sample series in a synchronous manner with the data output timing signal, so as to output the selected data as a third data sample series.

In one embodiment, the memory outputs a timing for outputting a data sample as a data sample effective signal, the data interpolating and selecting means receives the data sample effective signal so that whether a delay occurs or not in an access to the memory can be detected, and even when a delay occurs, performing an extrapolation operation using the data sample of the first data sample series previously obtained, whereby outputting the second data sample series without a delay.

Alternatively, the multi-media apparatus of this invention has an image display function and a sound processing function, wherein the multi-media apparatus includes a central processing unit, a main memory, a sound circuit, and an image display circuit which are connected to a system bus, and the sound circuit is provided with a sound data access apparatus according to claim 2, whereby sound data to be interpolated can be predicted from previously obtained sound data, when a delay occurs in the access to the main memory.

Alternatively, the electronic musical instrument of this invention generates the sound of a desired musical interval by using a data sample stored in a sound memory, wherein the electronic musical instrument includes a central processing unit, a main memory, an input device, a sound memory, a sound circuit, and a sound output device, and generates a sound similar to a desired sound detected by the input device by using sound data previously stored in the sound memory, so as to output the generated sound from the sound output device, and the sound circuit is provided with a sound data access apparatus according to claim 1, whereby musical interval conversion processing and chord generating processing can be implemented by the sound data access apparatus.

Alternatively, the data sample series interpolating method of this invention comprises the steps of:

interpolating an input first data sample series, so as to generate a second data sample series having sampling intervals which are narrower than those of the first data sample series, and outputting the second data sample series; and receiving the second data sample series, and selecting a data sample at predetermined sampling intervals from the second data sample series, so as to output the selected data sample as a third data sample series.

In still another embodiment of the sound data access apparatus, the data interpolating and selecting means obtains sound data at a timing indicated by the sound interpolation timing signal by using two adjacent samples of sound data, whereby the load of processing in an interpolation operation is reduced.

In still another embodiment of the sound data access apparatus, the data interpolating and selecting means obtains sound data at a timing indicated by the sound interpolation timing signal by using three or more adjacent samples of sound data.

Thus, the invention described herein makes possible the advantages of (1) providing a sound data access apparatus which has a small hardware scale and is capable of realizing musical interval conversion processing and has a sampling rate processing essential to the sound processing, (2) providing a sound data access apparatus which is capable of predictively outputting sound data even in the case where the memory access is delayed, (3) providing a data sample series interpolating apparatus and a data sample series interpolating method which is capable of generating a data sample series which has a desirable sampling rate by interpolating a received data sample series, (4) providing a data sample series access apparatus which is capable of reading a data sample series stored in memory and generating a data sample series of a desirable sampling rate, (5) providing a multi media apparatus which is capable of outputting the sound data in case of a delay which might occur during accessing of sound data stored in memory, and (6) providing an electronic musical instrument which is capable of generating sounds having various musical intervals and reproducing the sounds.

These and other advantages of the present invention will become apparent to those skilled in the art upon reading and understanding the following detailed description with reference to the accompanying figures.

DESCRIPTION OF THE PREFERRED EMBODIMENTS

Figure 3:
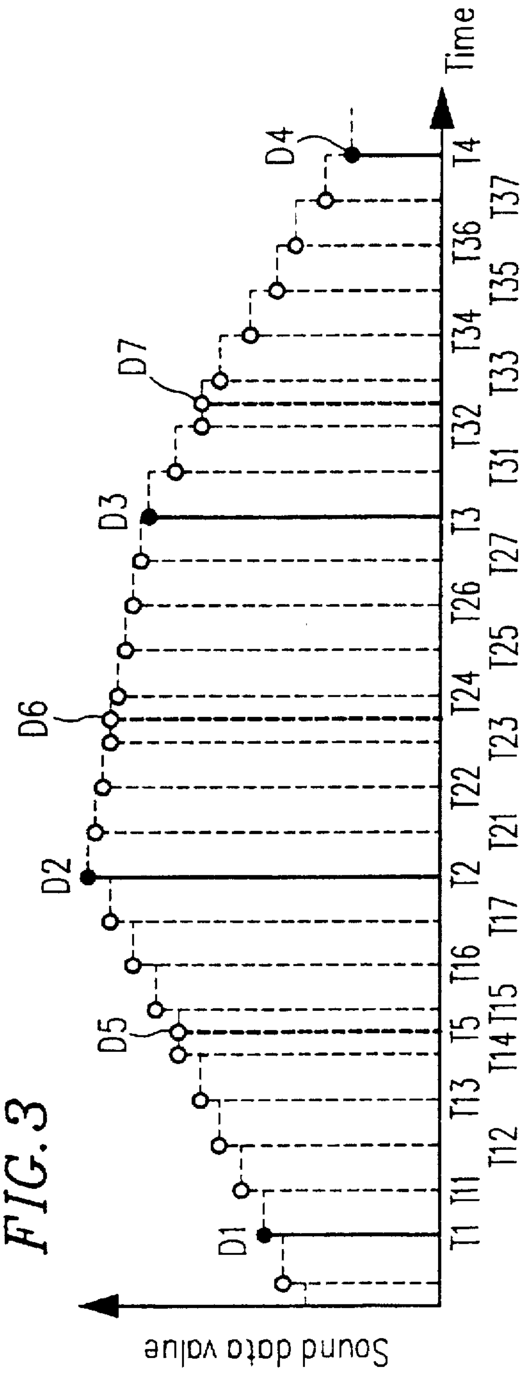
FIG. 3 is a bar graph showing examples of sound data values, interpolated sound data values, and sound output data values at respective times, in the case where there is no delay in sound memory access.

As shown in FIG. 3, according to the invention, an operation of interpolation is performed by using two adjacent samples of sound data, thereby obtaining interpolated data having a frequency which is n times as high as the sampling rate, in order to conduct the musical interval conversion and the sampling rate conversion. Herein, the frequency of the interpolated data is referred to as an interpolation clock rate.

In such a method, even when the read of new samples of sound data for the next interpolation is delayed, and cannot be obtained, two previous samples of sound data are used for extrapolation, so that the required sound data can be predicted. For example, even when the sample D3 at time T2 in FIG. 4 cannot be read, the sample D8 at time T21 can be obtained by extrapolation using the samples D1 and D2.

More specifically, the apparatus of the invention with the above-described configuration performs the interpolation of data in the following manner.

An address generating circuit generates an address for sound memory access, in a synchronous manner with a sound access timing signal output from a timing generating circuit, and outputs the address to a sound memory. A sample of sound data corresponding to the address is read from the sound memory. The sample of sound data is output as a sound data signal, and input into a data interpolating circuit. In the data interpolating circuit, two samples of sound data, i.e., the now received sound data signal and the immediately preceding sound data signal(or interpolated sample of sound data) are used for obtaining samples of sound data between the two samples by interpolation. The operation of interpolation is performed in a synchronous manner with a sound interpolation timing signal output from the timing generating circuit. The interpolated sound data is output as the sound output signal in a synchronous manner with a sound output timing signal output from the timing generating circuit. As the result of the above-described operation, sound data between adjacent samples of sound data in a sampled sound data series stored in the sound memory can be obtained by the operation of interpolation.

In addition, if the reading of sound data from the sound memory is delayed, the interpolation using the immediately previous two samples of sound data is continuously performed. As a result, until a new sample of sound data is read, the output sound data is predicted by extrapolation of sound data.

Hereinafter, the present invention will be described in detail by way of illustrative examples.

(EXAMPLE 1)

A first example of a sound data access apparatus of the invention will be described below with reference to the relevant drawings. In this example, it is assumed that the interpolation clock rate is 8 times as high as the sampling rate.

Figure 1:
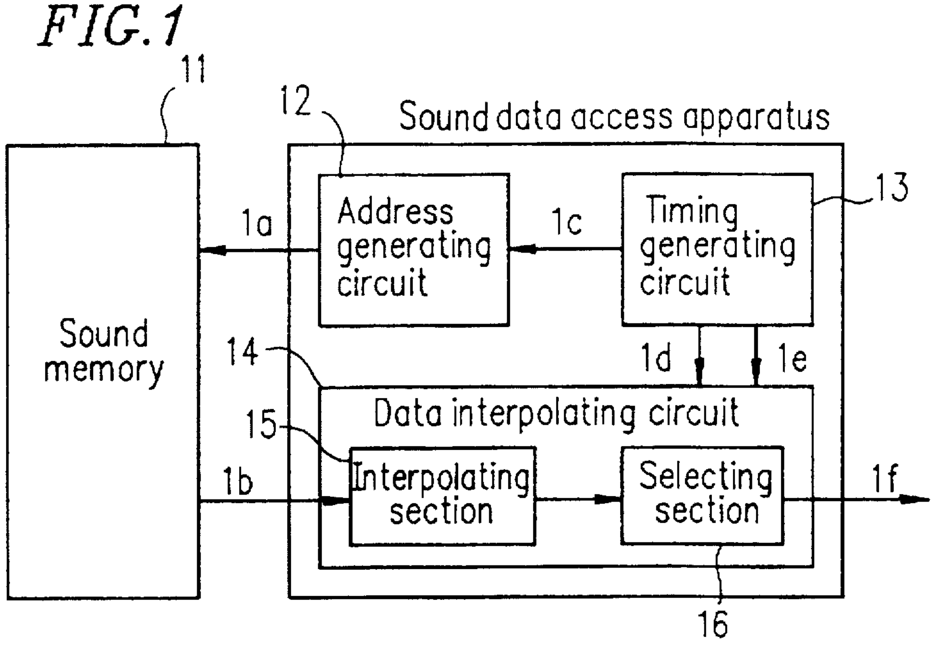
FIG. 1 is a block diagram showing the configuration of a sound data access apparatus in a first example according to the invention.

FIG. 1 is a block diagram showing the configuration of the sound data access apparatus in the first example according to the invention. The sound data access apparatus includes an address generating circuit 12, a timing generating circuit 13, and a data interpolating circuit 14. The data interpolating circuit 14 includes an interpolating section 15 and a selecting section 16.

The timing generating circuit 13 generates an access timing to a memory in accordance with the sound processing required from a CPU (not shown), and outputs a sound access timing signal 1*c* to the address generating circuit 12 at the generated timing. The timing generating circuit 13 also generates a timing for data interpolation, and outputs a sound interpolation timing signal 1*d* to the data interpolating circuit 14 at the generated timing. The timing generating circuit 13 also generates a sound output timing, and outputs a sound output timing signal 1*e* at the generated timing.

The address generating circuit 12 generates a memory address at which sound data is stored and outputs the memory address to a sound memory, by an instruction from a sound DSP or a sound processing circuit (not shown) in a synchronous manner with the sound access timing signal 1*c*.

The data interpolating circuit 14 includes the interpolating section 15 and the selecting section 16. The interpolating section 15 receives a sound data signal 1*b*. The interpolating section 15 obtains interpolated data between two adjacent samples of sound data among the received sound data signals in a synchronous manner with the sound interpolation timing signal 1*d*, and outputs the interpolated sample of data to the selecting section 16. The selecting section 16 selectively outputs interpolated data which is synchronized with the sound output timing signal 1*e* among the received interpolated samples of data, as a sound output signal 1*f*.

Figure 2:
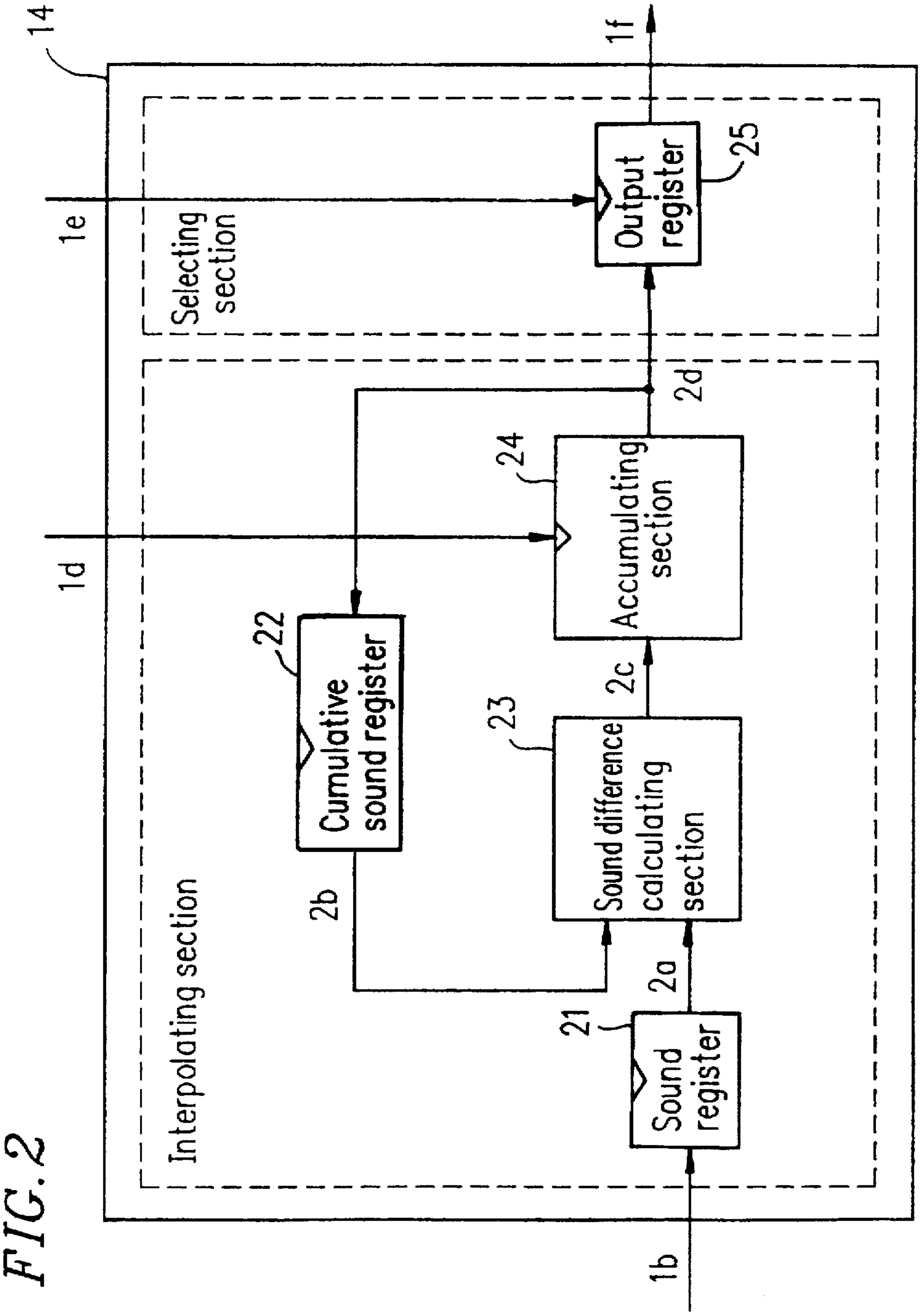
FIG. 2 is a block diagram showing the configuration of a data interpolating circuit in the first example according to the invention.

FIG. 2 is a block diagram showing the configuration of the data interpolating circuit 14. A sound register 21 stores the sound data signal 1*b* and outputs the stored sound data signal as an input sound signal 2*a*. A cumulative sound register 22 stores and holds an interpolated sound signal 2*d*, and outputs the data as a cumulative sound signal 2*b*. A sound difference calculating section 23 receives the input sound signal 2*a* and the cumulative sound signal 2*b*. A difference between the signals is multiplied by ⅛. The resulting data is output as a sound difference signal 2*c*. An accumulating section 24 accumulates the difference data input as the sound difference signal 2*c*, and outputs the cumulative result as an interpolation sound signal 2*d*. An output register 25 stores the interpolation sound signal 2*d* in a synchronous manner with the sound output timing signal 1*e*, and the stored contents are output as the sound output signal 1*f*.

The operation of the sound data access apparatus having the above-described configuration will be described with reference to FIG. 5.

It is assumed that a sound sample series (D1, D2, D3, . . . ) is stored in a sound memory 11. At time T0 in FIG. 5, the sound access timing signal 1*c* is input from the timing generating circuit 13 to the address generating circuit 12. The address generating circuit 12 generates an address at which the sample D2 is stored, and outputs the address as a sound address signal 1*a* to the sound memory 11. Then, the sample D2 is read from the sound memory 11, and the sound data signal 1*b* indicative of the data is input into the data interpolating circuit 14.

When the sample D2 is input into the data interpolating circuit 14, the sample D2 is stored in the sound register 21. The stored sample D2 is output as the input sound signal 2*a*. In the case where the data interpolating circuit 14 continuously operates, the interpolation sound signal 2*d* indicates the sample D1 when the input sound signal 2*a* is output. The interpolation sound signal 2*d* is input to the cumulative sound register 22. At a predetermined timing, the sample D1 indicated by the interpolation sound signal 2d is stored in the cumulative sound register 22. The stored sample D1 is output as the cumulative sound signal 2*b*. The cumulative sound signal 2*b* (the data value=D1) and the input sound signal 2*a* (the data value=D2) are input into the sound difference calculating section 23. The sound difference calculating section 23 obtains the data of (D2−D1)/8, and outputs the resulting data as the sound difference signal 2*c*. The sound difference signal 2*c* is input into the accumulating section 24. When the sound interpolation timing signal id is input, the accumulating section 24 adds the sound difference signal 2*c* to the data value of the interpolation sound signal 2*d* at that time, and the obtained data is output as an interpolation sound signal 2*d*.

Figure 5:
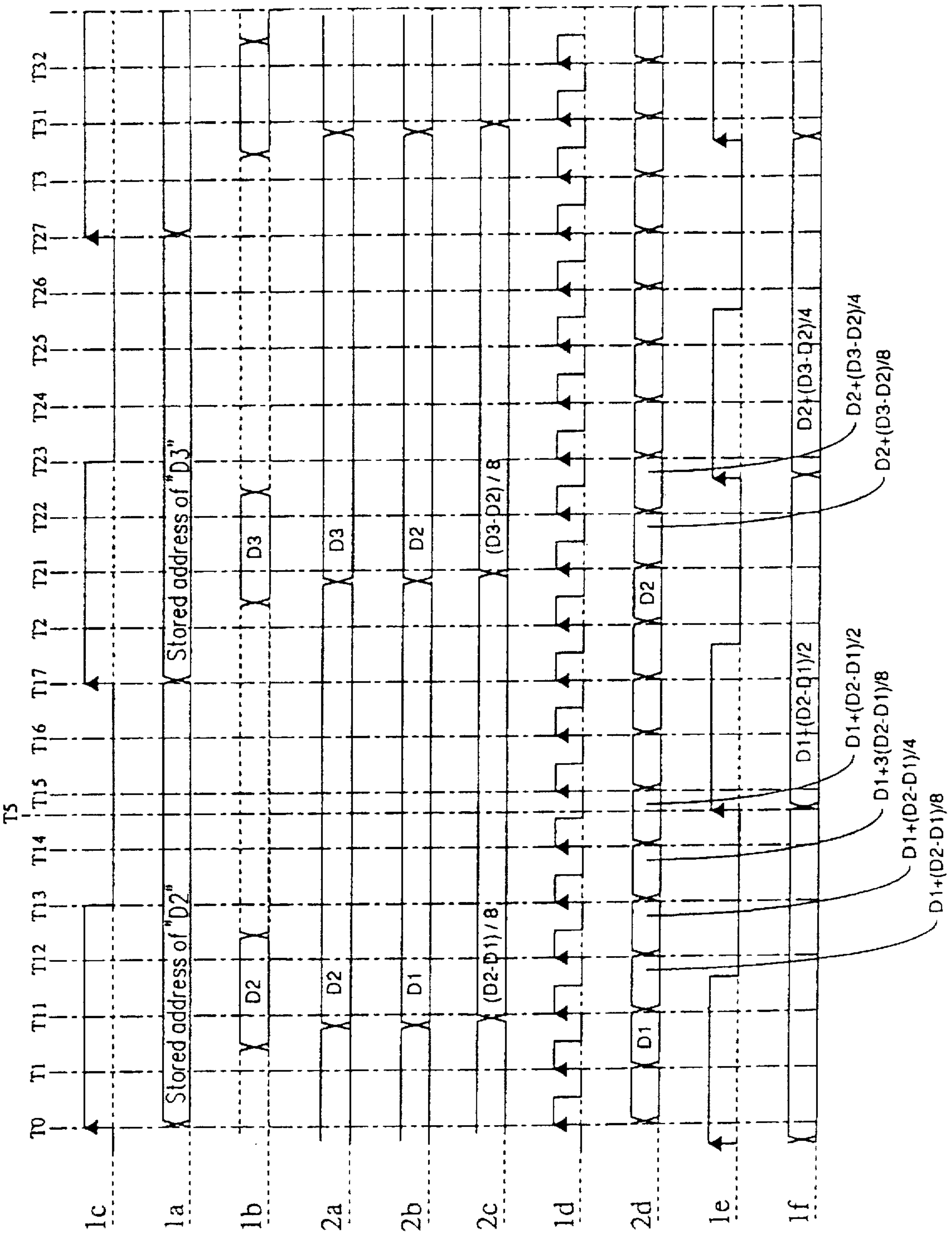
FIG. 5 is an operation timing diagram of respective signals in the first example according to the invention.

At time T11 in FIGS. 3 and 5, the interpolation sound signal 2*d* indicates the sample D1, and the sound difference signal 2*c* indicates the data value of (D2−D1)/8. If the sound interpolation timing signal 1*d* is input at time T11, the accumulating section 24 obtains the data of D1+(D2−D1)/8, and the resulting data is output as the interpolation sound signal 2*d*. At time T12, the sound difference signal 2*c* (the data value=(D2−D1)/8) is added to the interpolation sound signal 2*d* (the data value=D1+(D2−D1)/8), so that the interpolation sound signal 2*d* has a data value of D1+(D2−D1)/4. In the accumulating section 24, the accumulating calculation is performed in the same way, for every input of the sound interpolation timing signal 1*d*, and the data value of the interpolation sound signal 2*d* is updated. At time T5, the sound output timing signal 1*e* is input. When the sound output timing signal 1*e* is input into the output register 25, the data value of the interpolation sound signal 2*d* (the data value=D1+(D2−D1)/2, as the result of successive accumulation) is stored in the output register 25, and output as the sound output signal 1*f*.

Next, the relationship between the sampling rate of sound data and the operation clock rate of the LSI in which the sound data access apparatus is used will be described. The sampling rate of sound data is in the range of 8 kHz to 48 kHz in commercially available equipment, as shown in Table 1.

On the other hand, the operation clock rate of the LSI such as high-performance CPU and DSP is often set to be 40 MHz or a higher frequency. As for the data transfer clock rate of a system bus, it is often set to be 25 MHz or a higher frequency.

For simply comparing them, the sampling rate of sound data is assumed to be 40 kHz, and the operation clock rate of the sound data access apparatus is assumed to be 40 MHz.

The operation clock rate is 1000 times as high as the sampling rate. This means that the sound data access apparatus can perform operations for 1000 clock periods during the access to one sample of data. Also, the interpolation operation for sound data in the sound data access apparatus can be completed in one clock period.

This means that the time period between respective samples of sound data can be divided into 1000 equal time segments, and sound data at each time can be obtained by interpolation. That is, by using an interpolation clock rate which is 1000 times as high as the sampling rate, the interpolation processing can be performed in real time.

As described above, by installing the sound data access apparatus of the invention into the existing LSI, it is possible to perform sufficiently fine interpolation processing with respect to the sampling interval.

In addition, time-sharing processing is performed and the interpolation processing for a plurality of channels can be performed in a single sound data access apparatus. For example, the interpolation clock rate is set to be 16 times as high as the sampling rate, it is possible to perform the interpolation processing for about 60 channels (i.e., 1000/16=62.5).

Next, the relationship between the sampling rate of sound data and the operation clock rate or the memory reading rate of a system bus for a system in which the sound data access apparatus is used will be described.

Herein, the sampling rate, and the clock rate at which the sound data access apparatus reads data from a memory via a system bus are studied. For simply comparing them, the sampling rate is assumed to be 40 kHz, and the memory read clock rate is assumed to be 20 MHz.

The access time required for reading data from the memory is considered to be 50 ns (=1/20 MHz) or a time period which is twice or three times of 50 ns, on the basis of the memory access time of a general type of DRAM or SRAM. In addition, as for the waiting time when the access to memory coincidentally occurs and a delay occurs in reading data, the waiting time is about ten times as long as the access time, on the basis of the system bus waiting time in a general type of computer system.

Accordingly, the maximum waiting time in the case where sound data is to be read is approximately obtained by the following equation:

$$50\ \text{ns} \times 3 \times 10 = 1.5\ \mu\text{s}.$$

The sound data sampling time interval is 25 μs (=1/40 kHz), and the ratio thereof to the maximum waiting time is about 17 times.

This means that if the interpolation clock rate which is about 16 times as high as the sampling rate, the delay in reading the sound data can be accommodated in approximately one interpolation clock.

In the case where the interpolation processing is performed for the sampling time interval at an interpolation clock which is 16 times as high as the sampling rate, the interpolation is performed for 1/16 of the difference between adjacent samples of sound data in a unit of one interpolation clock. Therefore, an error of sound data in the case of a data read delay of one interpolation clock time can be about 1/16 times as large as the difference between the adjacent samples of data.

It is considered from the above description that the interpolation clock rate which is about 8 times to 32 times as high as the sampling rate is suitable. If the interpolation clock rate is obtained by multiplying the sampling rate by a power of 2, an interpolation circuit can be easily realized (in a small size). Accordingly, an interpolation clock rate which is 8 times, 16 times, 32 times, or the like can be optimum.

If the interpolation clock is 16 times as high as the sampling rate, the sound data of about 60 channels can be processed in a time sharing manner. Thus, the performance for simultaneously processing sound data of about 30 channels of the recent sound processing apparatus can be satisfied.

As a result, it is unnecessary to provide a buffer memory for compensating for the access delay between the data interpolating circuit and the sound memory.

The sound data access apparatus of this example operates as described above, so that interpolated data for sound data stored in the sound memory 11 is always calculated, and a desired timing is generated as a sound output timing signal, whereby it is possible to obtain sound data at a desired sampling rate. As a result, by D/A converting the resulting sound data by a D/A converter operating at a desired sampling rate, it is possible to execute the processing of musical interval conversion and sampling rate conversion. The sound data access apparatus of this example does not necessitate any multipliers.

In this example, interpolated data at a plurality of time points are sequentially obtained in a time series manner. Alternatively, in a versatile method, interpolated data at a plurality of time points may be simultaneously obtained.

In an exemplary case, the time interval between time T and time T+1 is divided at eight time points (T to T+1/8, T+1/8 to T+2/8, . . . , T+7/8 to T+1), and interpolated data at respective time points are obtained. In such a case, if the sound data to be output at time t is represented by D(t), the interpolated data to be obtained is shown as follows in Table 2.

TABLE 2

| Interpolation time point | Interpolated data |
|---|---|
| T~T + 1/8 | D(T) |
| T + 1/8~T + 2/8 | D(T + 1/8) = D(T)*7/8 + D(T + 1)*1/8 |
| T + 2/8~T + 3/8 | D(T + 2/8) = D(T)*6/8 + D(T + 1)*2/8 |
| T + 3/8~T + 4/8 | D(T + 3/8) = D(T)*5/8 + D(T + 1)*3/8 |
| T + 4/8~T + 5/8 | D(T + 4/8) = D(T)*4/8 + D(T + 1)*4/8 |
| T + 5/8~T + 6/8 | D(T + 5/8) = D(T)*3/8 + D(T + 1)*5/8 |
| T + 6/8~T + 7/8 | D(T + 6/8) = D(T)*2/8 + D(T + 1)*6/8 |
| T + 7/8~T + 1 | D(T + 7/8) = D(T)*1/8 + D(T + 1)*7/8 |

The interpolated data can be simultaneously obtained at a timing at which the samples D(T) and D(T+1) are input. The simultaneously obtained interpolated data are stored in an output storage circuit, and the sound output signal 1*f* can be output in a synchronous manner with the sound output timing signal 1*e* from the timing generating circuit.

In this example, the interpolation operation for obtaining the interpolated data is performed by using two adjacent samples of data. Alternatively, the interpolation operation can be performed by using three or more adjacent samples of data.

Figure 17:
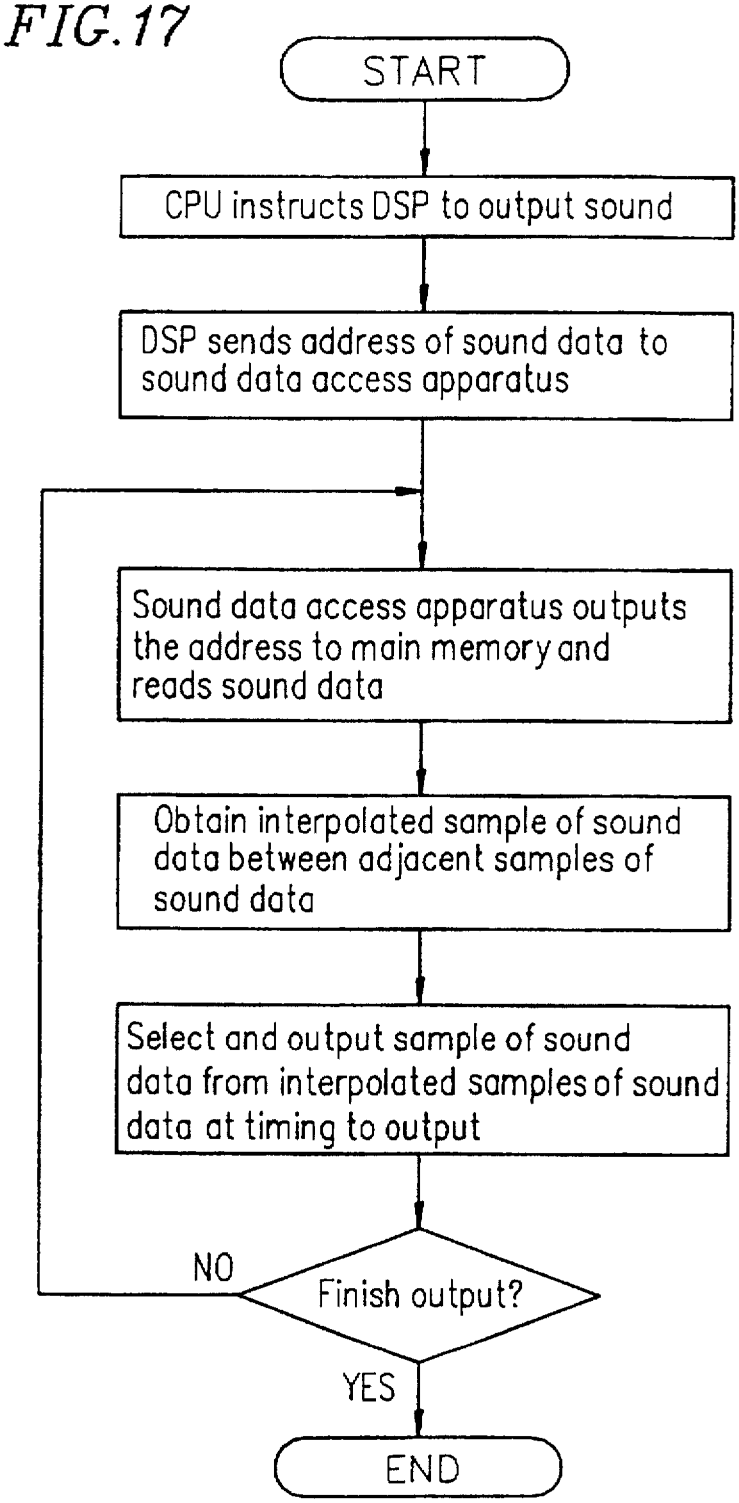
FIG. 17 is a flowchart in the case where the sound data access apparatus of the invention is implemented by software.
Figure 18:
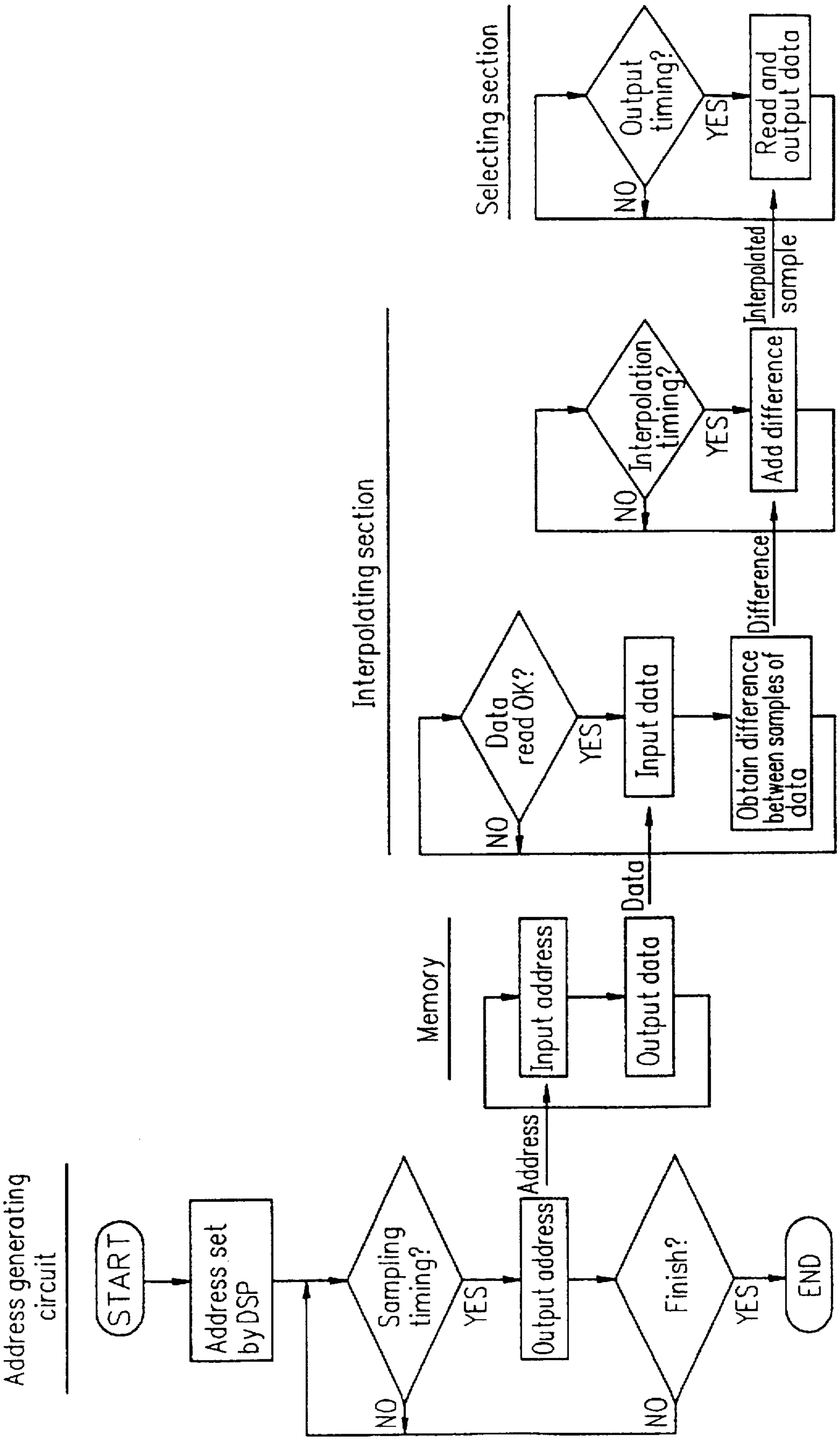
FIG. 18 is a detailed flowchart in the case where the sound data access apparatus of the invention is implemented by software.

In addition, in this example, the invention is realized in the hardware. Alternatively, by using a processor which can be programmed such as DSP, the invention can be realized in software. The flowcharts in the case where the invention is realized in computer software is shown in FIGS. 17 and 18.

In this example, the interpolation clock rate is selected to be 8 times as high as the sampling rate. However, the interpolation clock rate is not limited to 8 times as high as the sampling rate, and can be any desired frequency which is obtained by multiplying the sampling rate by a real number. If the ratio of the frequency of the sound interpolation timing signal to the frequency of the sound access timing signal is set to be a power of 2, it is possible to realize the dividing operation in the sound difference calculating circuit by bit shifting.

Moreover, this example has been described by using sound data. However, the sound data access apparatus of this example is applicable to the case where any kind of sampling data other than sound data is to be accessed.

(EXAMPLE 2)

Figure 6:
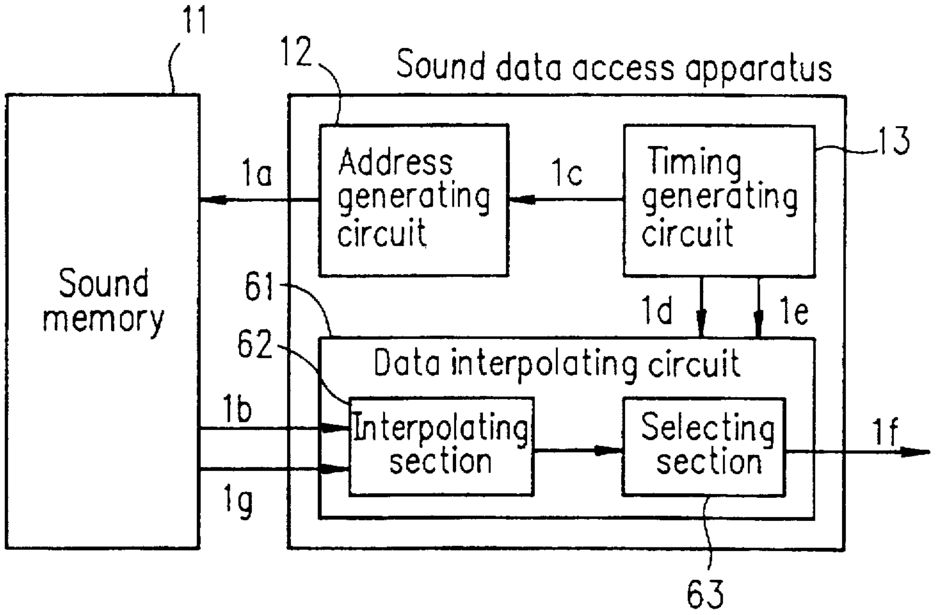
FIG. 6 is a block diagram showing the configuration of a sound data access apparatus in a second example according to the invention.

A second example of a sound data access apparatus of this invention will be described. FIG. 6 is a block diagram showing the configuration of the second example. The second example is an apparatus in the case where a delay may occur in the sound memory access.

Components and operations which are different from those in the fist example will be described in detail.

Hereinafter, the sound data access apparatus in the second example of the invention is described with reference to the relevant drawings. In this example, it is assumed that the interpolation clock rate is 8 times as high as the sampling rate.

FIG. 6 is a block diagram showing the configuration of the sound data access apparatus in this example of the invention.

In FIG. 6, circuits which are indicated by the same reference numerals as those in FIG. 1 are identical to those in the first example, so that the detailed descriptions thereof are omitted.

A data interpolating circuit 61 receives a sound interpolation timing signal 1*d*, a sound output timing signal 1*e*, a sound data signal 1*b*, and a sound data effective signal 1*g*, and outputs a sound output signal 1*f*. The data interpolating circuit 61 latches the sound data signal 1*b* in a synchronous manner with the sound data effective signal 1*g*. Based on the latched and adjacent samples of sound data, sound data at a timing indicated by the sound interpolation timing signal 1*d* is obtained by interpolation. The sound data after the interpolation is output as the sound output signal 1*f* at a timing indicated by the sound output timing signal 1*e*.

Figure 7:
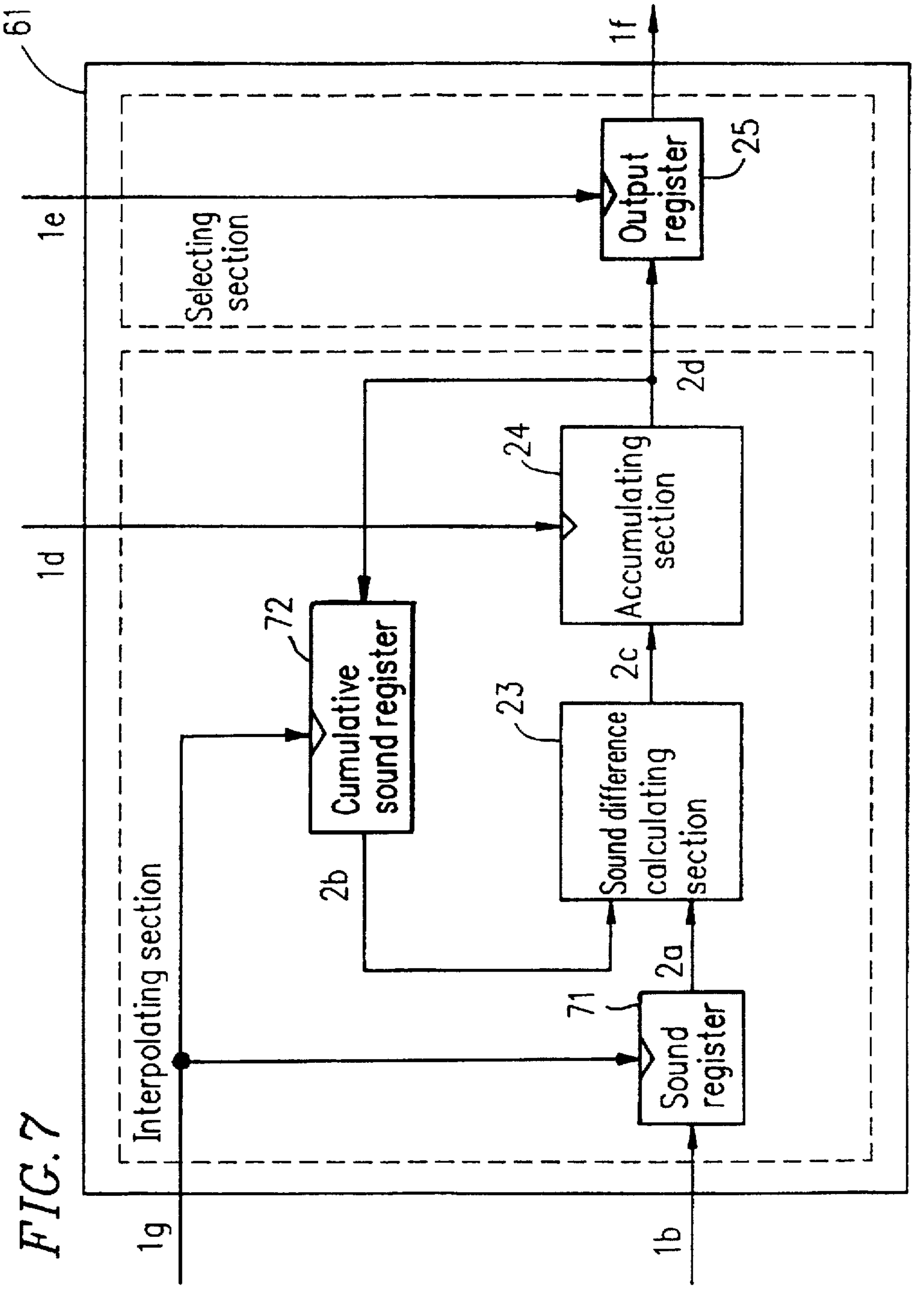
FIG. 7 is a block diagram showing the configuration of a data interpolating circuit in the second example according to the invention.

The data interpolation circuit 61 is constructed as shown in FIG. 7. A sound register 71 stores the sound data signal 1*b* at a timing indicated by the sound data effective signal 1*g*, and outputs the data as an input sound signal 2*a*. A cumulative sound register 72 stores and holds an interpolation sound signal 2*d* in a synchronous manner with the sound data effective signal 1*g*, and outputs the data as a cumulative sound signal 2*b*. A sound difference calculating section 23 receives the input sound signal 2*a* and the cumulative sound signal 2*b*. A difference between these signals is obtained and multiplied by ⅛. The resulting data is output as a sound difference signal 2*c*. An accumulating section 24 accumulates the sound difference data which is input as the sound difference signal 2*c*, and outputs the accumulated result as an interpolation sound signal 2*d*. An output register 25 receives the interpolation sound signal 2*d*, and stores the signal in a synchronous manner with the sound output timing signal 1*e*. The output register 25 outputs the stored contents as the sound output signal 1*f*.

As for the sound data access apparatus having the above-described configuration, the operation in the case where a delay occurs in the sound data reading from the sound memory 11 will be described.

Figure 4:
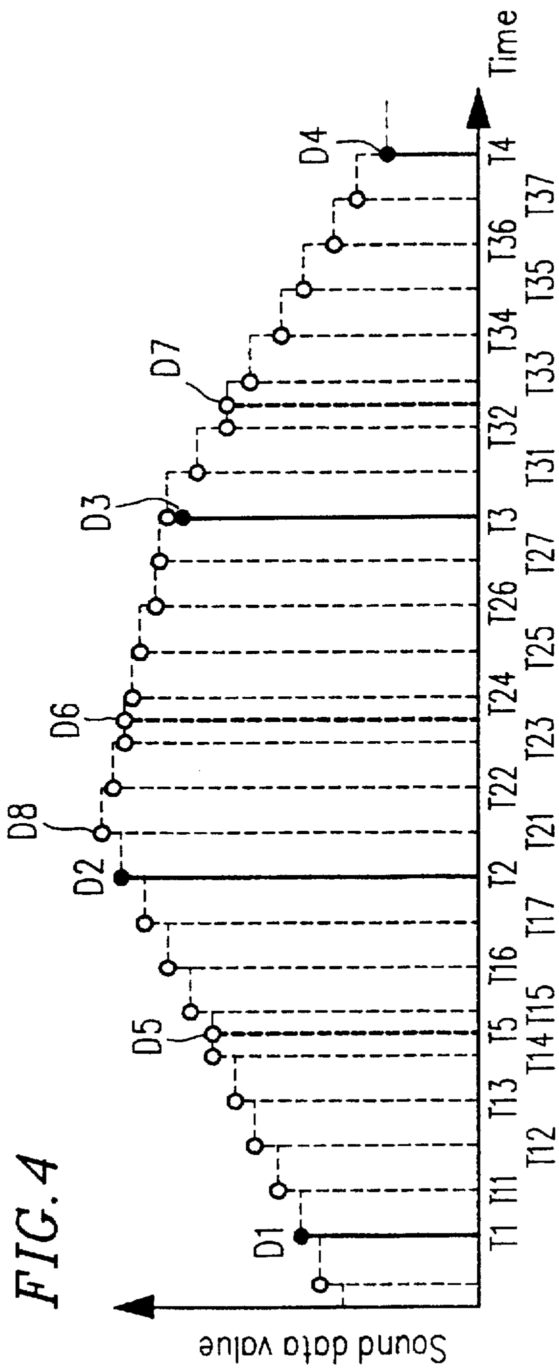
FIG. 4 is a bar graph showing examples of sound data values, interpolated sound data values, and sound output data values at respective times, in the case where a delay occurs in sound memory access.
Figure 8:
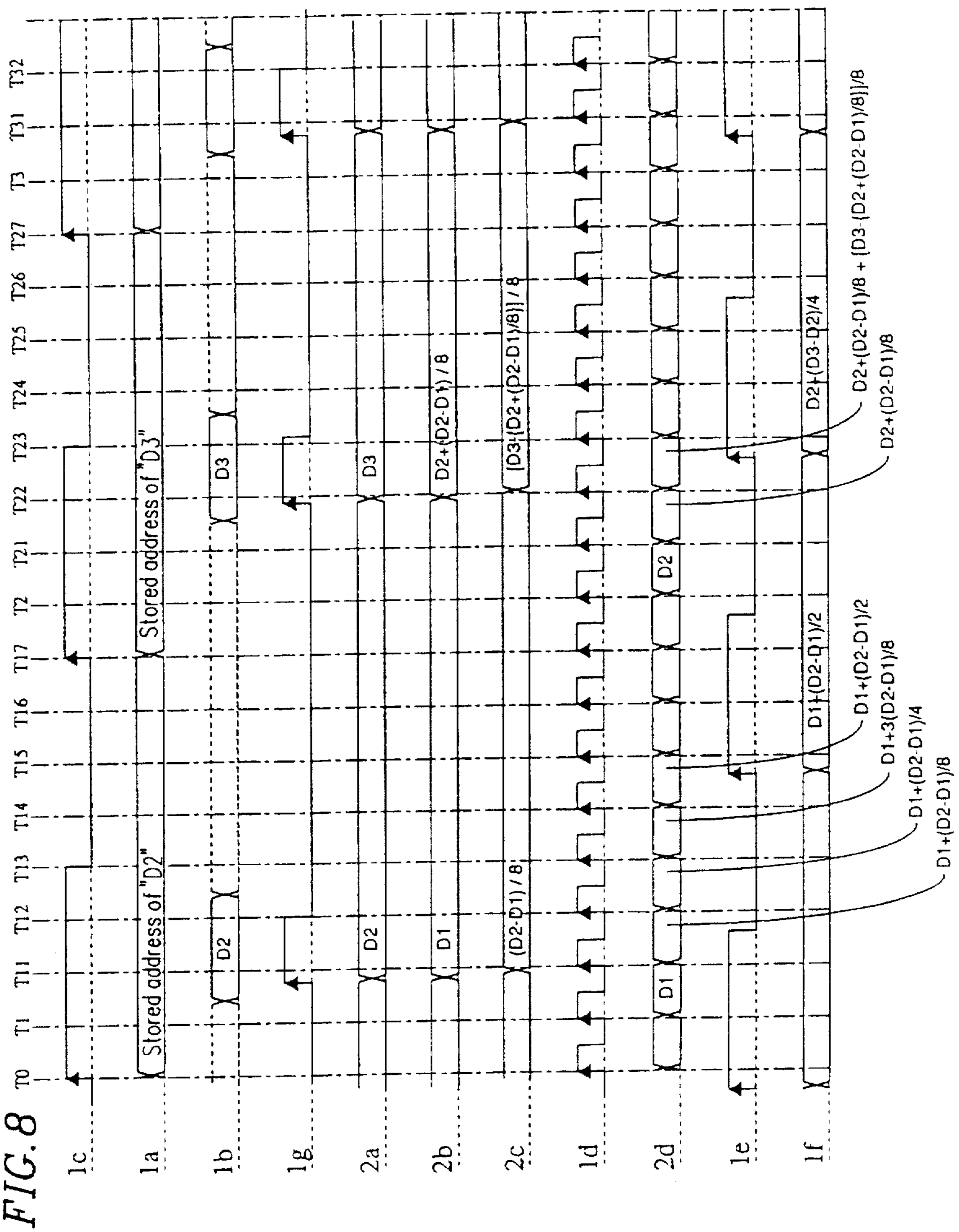
FIG. 8 is an operation timing diagram of respective signals in the case where a delay occurs in memory access in the second example according to the invention.
Figure 9:
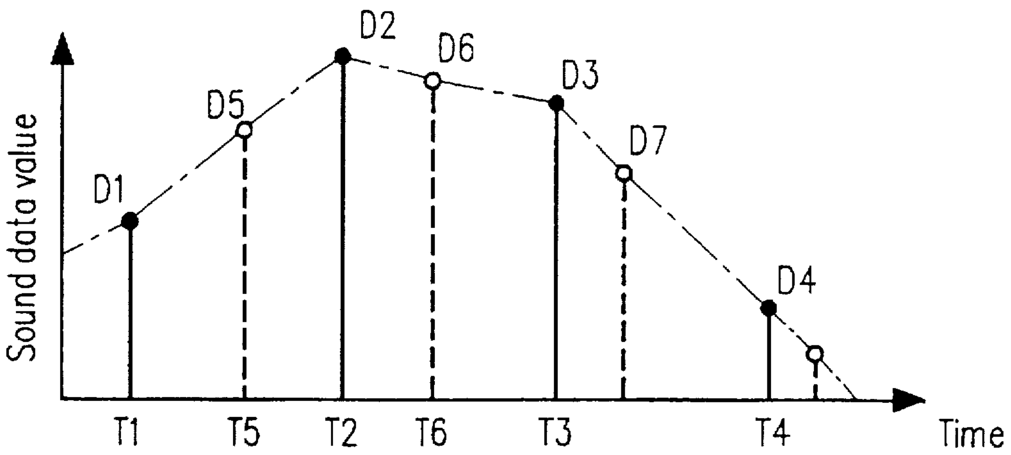
FIG. 9 is an explanatory diagram for conventional data interpolation in the case where no delay occurs.
Figure 10:
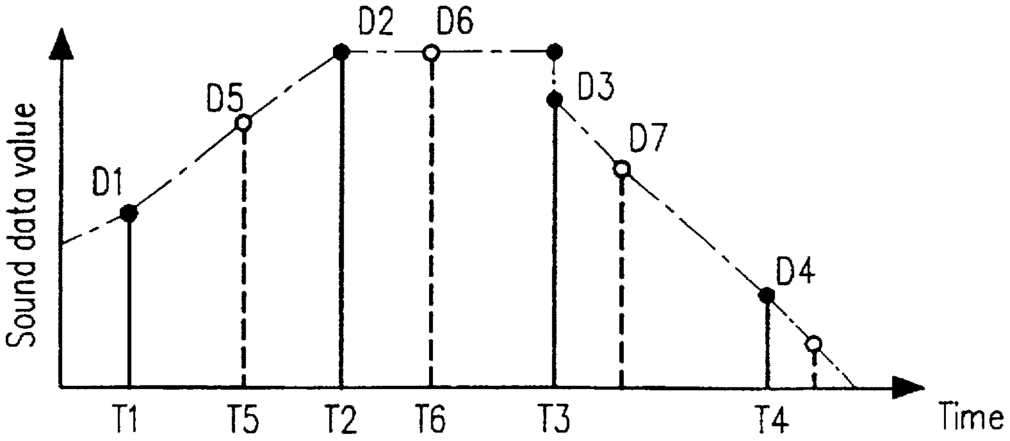
FIG. 10 is an explanatory diagram for conventional data interpolation in the case where a delay occurs.

The sound memory 11 stores samples of sound data series (the data values are D1, D2, D3 . . . shown in FIG. 4). At time T17 in FIGS. 4 and 8, the sound access timing signal 1*c* is output from the timing generating circuit 13, and input into the address generating circuit 12. In the address generating circuit 12, an address at which the sample D3 is stored is generated, and the generated address is output to the sound memory 11 as a sound address signal 1*a*. In the case where the reading from the sound memory 11 is immediately performed, the sample D3 is read between time T2 and time T21. In another case, for example, where the access is delayed due to other accesses to the sound memory 11 (such as writing of data and reading of sound data for another channel), the sample D3 is read from the sound memory 11 between time T21 and time T22, and input into the data interpolating circuit 61 as the sound data signal 1*b*.

As described above in the first example, in the case where there is no delay in access to the sound memory 11, the data value of the interpolation sound signal 2*d* at time T14 is D1+(D2−D1)/2, and the data value of the interpolation sound signal 2*d* at time T2 is D2. In such a case, at time T21, the data value of the sound input signal 2*a* is D3, and the data value of the cumulative sound signal 2*b* is D2. Thus, a new difference value is obtained by the sound difference calculating section 23, and the obtained difference value is accumulated in the accumulating section 24.

However, in the case where a delay occurs in the access to the sound memory 11 and the sample D3 is not obtained at time T2, the stored contents of the sound register 71 and the cumulative sound register 72 are not updated. Accordingly, the data value of the sound difference signal 2*c* as the output of the sound difference calculating section 23 is not varied. Therefore, as the accumulated result in the accumulating section 24 at time T21, the data value D2+(D2–D1)/8 is output as the interpolation sound signal **2*d*. The data value serves as predicted sound data in the case where a delay occurs in the reading from the sound memory 11**.

Thereafter, the sample D3 is read from the sound memory 11 between time T21 and time T22. At this timing, the sample D3 is stored in the sound register 71. At the same time, the interpolation sound signal **2*d* (the data value=D2+(D2–D1)/8) is stored in the cumulative sound register 72, and a new difference is obtained in the sound difference calculating section 23. The resulting value [D3–{D2+(D2–D1)/8}]/8 is input into the accumulating section 24 as the sound difference signal 2*c***. Then, the accumulation is performed again, so as to obtain interpolated sound data.

As described above, in the sound data access apparatus of this example, even if a delay occurs in the reading of sound data from the sound memory, sound data can be continuously output by extrapolation based on previous sound data.

As described above, according to this example, a sound difference calculating section is provided. The sound difference calculating section calculates the difference between adjacent samples of input sound data. Then, an accumulating section continuously obtains the accumulation of the difference. Accordingly, a data value for sound data at any desired timing between samples of data can be obtained by interpolation. By sampling again the interpolated sound data at a sound output timing, it is possible to execute processing such as musical interval conversion and sampling rate conversion. In addition, by continuously accumulating the difference value, interpolated sound data can be predicted by extrapolation, even when the reading of sound data from the memory is delayed.

In order to explain the fact that an error of interpolated data is not accumulated or propagated, but is converged on a precise value when a delay occurs in the reading of sampling data, the interpolation time points and interpolated data at the time points are shown in Table 3.

TABLE 3

| Interpolation time point | Interpolated data | Read data |
|---|---|---|
| T1 | D1 | D2 (No delay) |
| T11 | D1 + (D2-D1)*1/8 | |
| T12 | D1 + (D2-D1)*2/8 | |
| T13 | D1 + (D2-D1)*3/8 | |
| T14 | D1 + (D2-D1)*4/8 | |
| T15 | D1 + (D2-D1)*5/8 | |
| T16 | D1 + (D2-D1)*6/8 | |
| T17 | D1 + (D2-D1)*7/8 | |
| T2 | D1 + (D2-D1)*8/8<br>= D2 | Cannot Read<br>due to delay |
| T21 | D2 + (D2-D1)*1/8<br>= D2*9/8 – D1*1/8 | D3(D3 is read<br>at this time) |
| T22 | D2*9/8 – D1*1/8 + {D3 – (D2*9/8 – D1*1/8)}*1/8 | |
| T23 | D2*9/8 – D1*1/8 + {D3 – (D2*9/8 – D1*1/8)}*2/8 | |
| T24 | D2*9/8 – D1*1/8 + {D3 – (D2*9/8 – D1*1/8)}*3/8 | |
| T25 | D2*9/8 – D1*1/8 + {D3 – (D2*9/8 – D1*1/8)}*4/8 | |
| T26 | D2*9/8 – D1*1/8 + {D3 – (D2*9/8 – D1*1/8)}*5/8 | |
| T27 | D2*9/8 – D1*1/8 + {D3 – (D2*9/8 – D1*1/8)}*6/8 | |
| T3 | D2*9/8 – D1*1/8 + {D3 – (D2*9/8 – D1*1/8)}*7/8<br>= D3*7/8 + D2*9/64 – D1*1/64 | D4(No delay) |
| T31 | D3*7/8 + D2*9/64 – D1*1/64 +<br>{D4 – (D3*7/8 + D2*9/64 – D1*1/64)}*1/8 | |
| T32 | D3*7/8 + D2*9/64 – D1*1/64 +<br>{D4 – (D3*7/8 + D2*9/64 – D1*1/64)}*2/8 | |
| T33 | D3*7/8 + D2*9/64 – D1*1/64 +<br>{D4 – (D3*7/8 + D2*9/64 – D1*1/64)}*3/8 | |
| T34 | D3*7/8 + D2*9/64 – D1*1/64 +<br>{D4 – (D3*7/8 + D2*9/64 – D1*1/64)}*4/8 | |
| T35 | D3*7/8 + D2*9/64 – D1*1/64 +<br>{D4 – (D3*7/8 + D2*9/64 – D1*1/64)}*5/8 | |
| T36 | D3*7/8 + D2*9/64 – D1*1/64 +<br>{D4 – D3*7/8 + D2*9/64 – D1*1/64)}*6/8 | |
| T37 | D3*7/8 + D2*9/64 – D1*1/64 +<br>{D4 – (D3*7/8 + D2*9/64 – D1*1/64) }*7/8 | |
| T4 | D3*7/8 + D2*9/64 – D1*1/64 +<br>{D4 – (D3*7/8 + D2*9/64 – D1*1/64)}*8/8<br>= D4 | D5 (No delay) |
| T41 | D4 + (D5-D4)*1/8 | |

As described above, even in the case where the reading of sampling data at time T2 is delayed, if the succeeding sample (D4) can be obtained without delay, proper sample D4 can be obtained at time T4.

As a result, even when the reading of sound data from the sound memory is delayed, sound data can be predicted and output, so that it is unnecessary to provide a buffer memory in an input section of the data interpolating circuit.

In this example, interpolated data at a plurality of time points are sequentially obtained in a time-series manner. Alternatively, in a more versatile method, interpolated data at a plurality of time points can be simultaneously obtained.

In this example, the interpolation operation for obtaining the interpolated data is performed by using two adjacent samples of data. Alternatively, the interpolation operation can be performed by using three or more adjacent samples of data.

In addition, in this example, the invention is realized in the hardware. Alternatively, by using a processor which can be programmed such as DSP, the invention can be realized in software.

In this example, the interpolation clock rate is selected to be 8 times as high as the sampling rate. However, the interpolation clock rate is not limited to 8 times as high as the sampling rate, and can be any desired frequency which is obtained by multiplying the sampling rate by a real number. If the ratio of the frequency of the sound interpolation timing signal to the frequency of the sound access timing signal is set to be a power of 2, it is possible to realize the dividing operation in the sound difference calculating circuit by bit shifting.

Moreover, this example has been described by using sound data. However, the sound data access apparatus of this example is applicable to the case where any kind of sampling data other than sound data is to be accessed.

(EXAMPLE 3)

Hereinafter a third example of a sound data access apparatus of the invention will be described. In the sound data access apparatus of this invention, desired sound data can be obtained by selecting the generated interpolated data at a required timing. Therefore, if the apparatus is provided with two selecting sections, two sound sample series can be simultaneously generated from one sound sample series.

Such a configuration is effectively applicable to an application in which sound data of various musical intervals should be simultaneously generated from sound data of limited musical intervals, especially to a musical synthesizer. For example, this example is applied to the musical interval conversion processing, two sound of "mi" and "so" are simultaneously generated from a sampled sound of "do", and the two sound can be output as a chord.

In addition, a plurality of sound sample series whose sampling rate is various can be generated from one sample of sound data.

Figure 11:
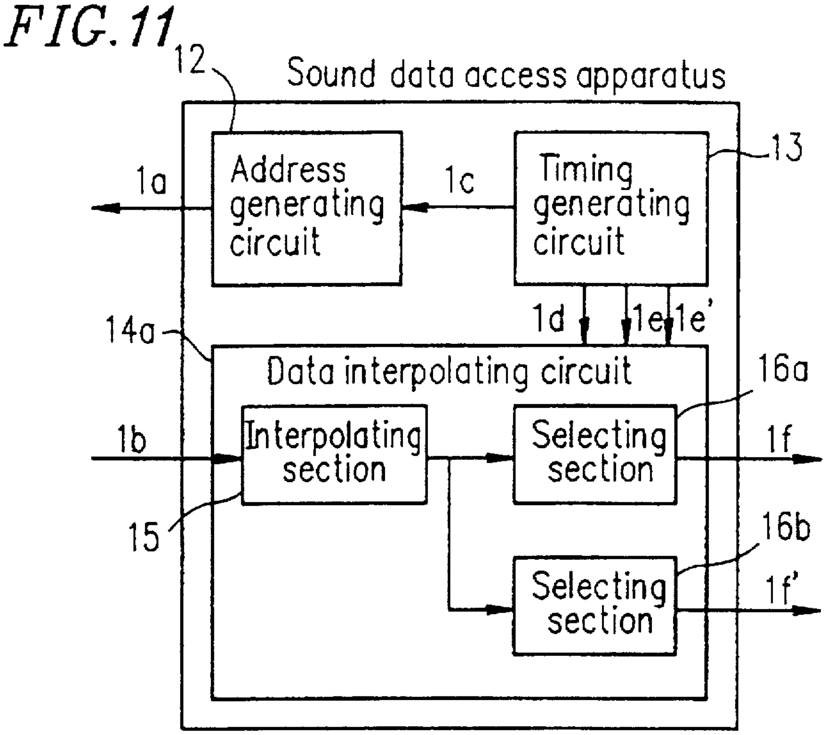
FIG. 11 is a block diagram showing the configuration of a sound data access apparatus including a plurality of selecting sections in a third example according to the invention.

FIG. 11 is a block diagram showing the configuration of the third example. Circuits indicated by the same reference numerals as those in FIG. 1 are identical to those described in the first example, so that the detailed descriptions thereof are omitted.

Part of the operation of the sound data access apparatus of this example which is different from the first example will be described in detail. The timing generating circuit 13 generates two sound output timing signals 1*e* and 1*e'* which are respectively input into selecting sections 16*a* and 16*b*. The selecting sections 16*a* and 16*b* output sound output signals 1*f* and 1*f*, respectively, in a synchronous manner with the respective sound output timing signals.

Figure 12:
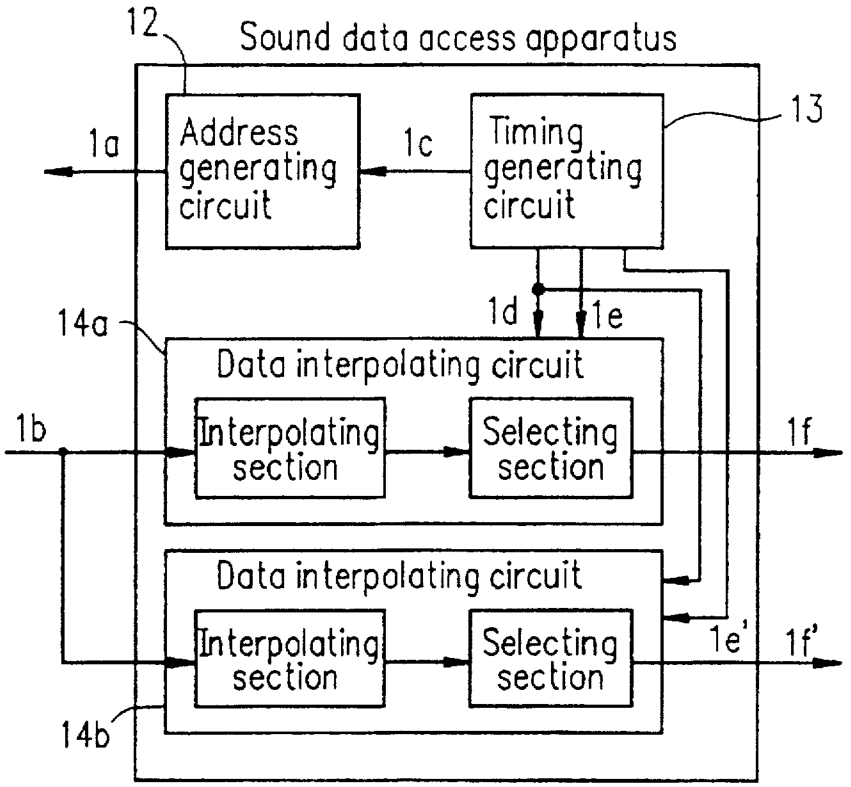
FIG. 12 is a block diagram showing the configuration of the sound data access apparatus including a plurality of data interpolating circuits in the third example according to the invention.

This example can be realized, as shown in FIG. 12, in such a configuration that two data interpolating circuits 14*a* and 14*b* are provided in parallel.

Figure 13:
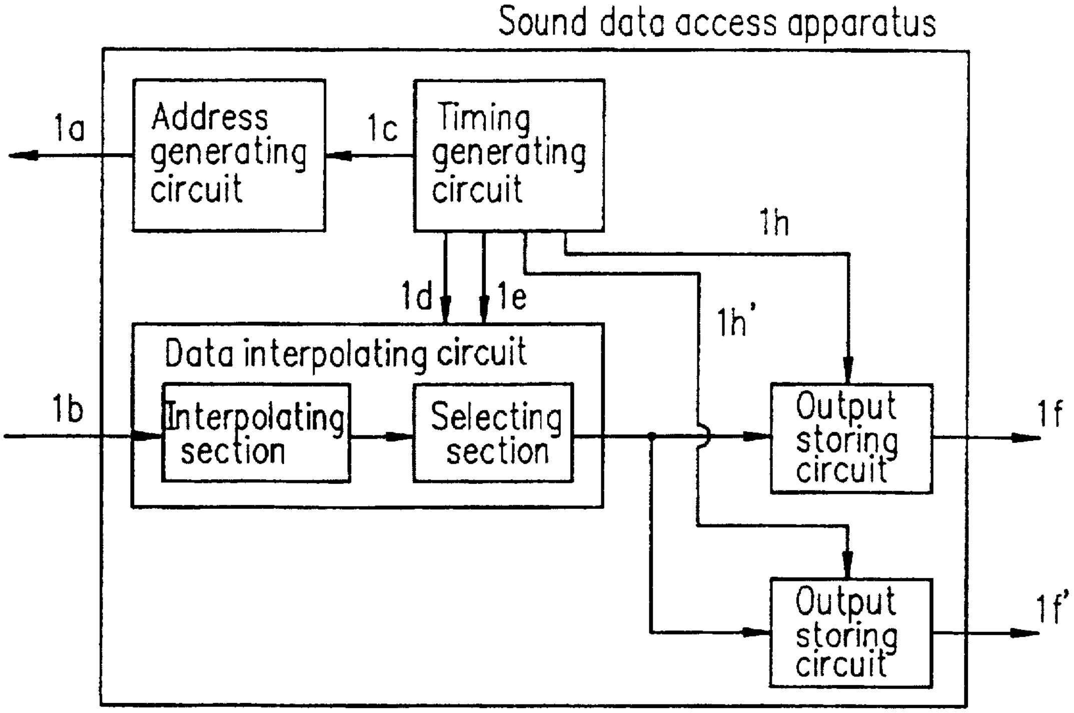
FIG. 13 is a block diagram showing the configuration of the sound data access apparatus in which interpolated data at a plurality of time points are simultaneously obtained in the third example according to the invention.

Alternatively, by providing two output storing circuits as shown in FIG. 13, the interpolating circuit can generate two sound output signals by performing time-sharing processing.

In this example, the case where two sound output signals are generated is described. Alternatively, three or more sound output signals can be generated.

Also in this example, similar to the second example, the interpolating section has a configuration for compensating for the delay of data.

In addition, in this example, the invention is realized in the hardware. Alternatively, by using a processor which can be programmed such as DSP, the invention can be realized in software.

Moreover, this example has been described by using sound data. However, the sound data access apparatus of this example is applicable to the case where any kind of sampling data other than sound data is to be accessed.

(EXAMPLE 4)

Hereinafter, an example of a multi-media personal computer to which the sound data access apparatus of the invention is applied will be described.

Figure 14:
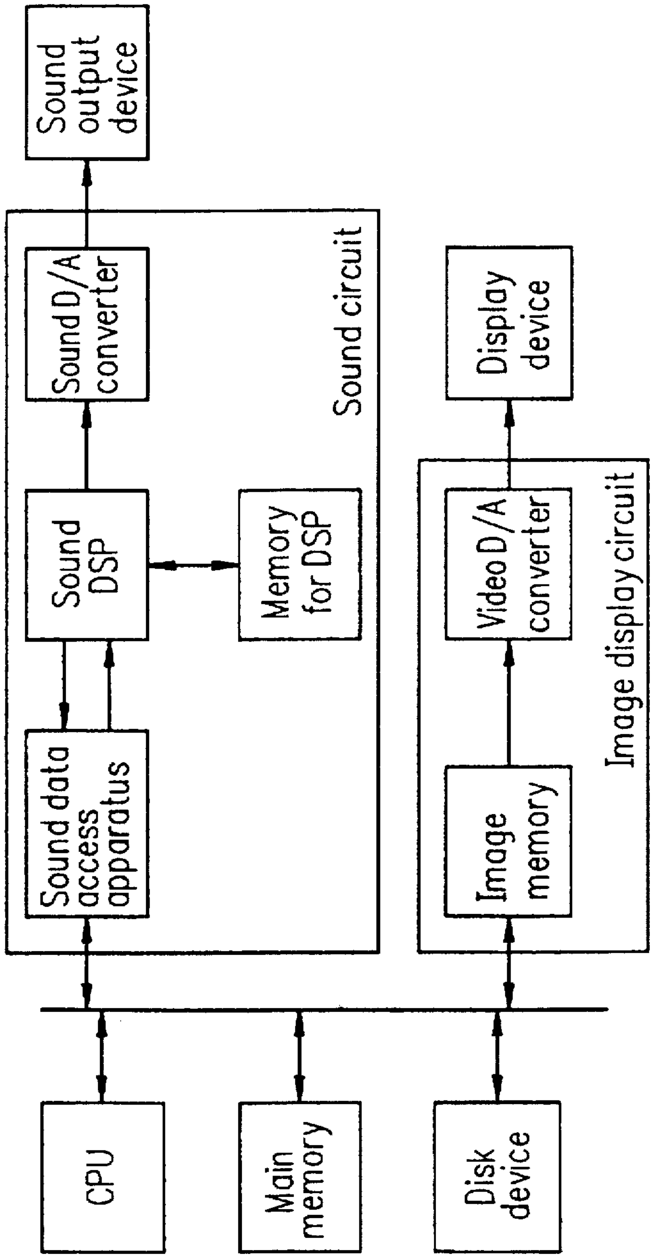
FIG. 14 is a block diagram showing the configuration of a multi-media personal computer in a fourth example according to the invention.

FIG. 14 is a block diagram showing the configuration of the multi-media personal computer.

The multi-media personal computer includes a CPU, a main memory, a disk device, a sound circuit, an image display circuit, a sound output device, and a display device.

The CPU controls the sound circuit, the image display circuit, the disk device, and the like, and executes programs. The main memory stores programs, sound data, and image data which are read from the disk device as required. The disk device stores programs, sound data, image data, and the like. The disk device can be realized in a form of a hard disk, CD-ROM, or the like. The sound circuit performs the sound processing, and includes a sound data access apparatus, a sound DSP, a memory for DSP, and a sound D/A converter.

The image display circuit includes an image memory and a video D/A converter.

The sound output device outputs sound data which is output from the sound circuit, as sounds. The sound output device is constructed with loud speakers, or the like.

The display device displays an image, and is constructed by a CRT display, or the like.

The operation of the multi-media personal computer having the above-described configuration will be described.

Herein, an exemplary case in which, while image data stored in the main memory is displayed, the processing of sampling rate conversion for sound data is simultaneously performed, and the sound data is output after the addition of reverberation in the sound DSP will be described.

The CPU instructs the sound DSP to perform the processing of sampling rate conversion and addition of reverberation, and to output the sounds.

Next, the CPU reads image data from the main memory, and writes the image data into the image memory of the image display circuit.

At the same time, the sound DSP instructs the sound data access apparatus to perform the processing of sampling rate conversion, and the reading of sound data from the main memory.

The sound data access apparatus reads the specified sound data from the main memory, performs the sampling rate conversion, and outputs the result to the sound DSP. Herein, the sound data access apparatus is, for example, a circuit described in the second example and can output predicted data even when a delay of memory access occurs.

The sound DSP performs the addition of reverberation in accordance with the DSP program, and outputs the result to the sound D/A converter. The D/A converted data is output from the sound output device.

On the other hand, the image display circuit sequentially outputs the written image data by the CPU to the video D/A converter, and the image is displayed on the display device.

In the above-described operation, the sound processing and the image display processing are performed in parallel by the sound DSP and the CPU, respectively, so that the sound processing and the image display processing are simultaneously executed. Even when a delay occurs in the reading of data from the main memory, the sound data access apparatus has a function for outputting data obtained by extrapolation. Therefore, no delay is caused in the sounds output from the output device.

Unlike the conventional multi-media personal computer, it is unnecessary to provide a sound data buffer circuit.

In addition, the sound data access apparatus may have a function for simultaneously outputting data over a plurality of channels.

(EXAMPLE 5)

Hereinafter, an example of an electronic piano to which the sound data access apparatus of the first example is applied will be described.

Figure 15:
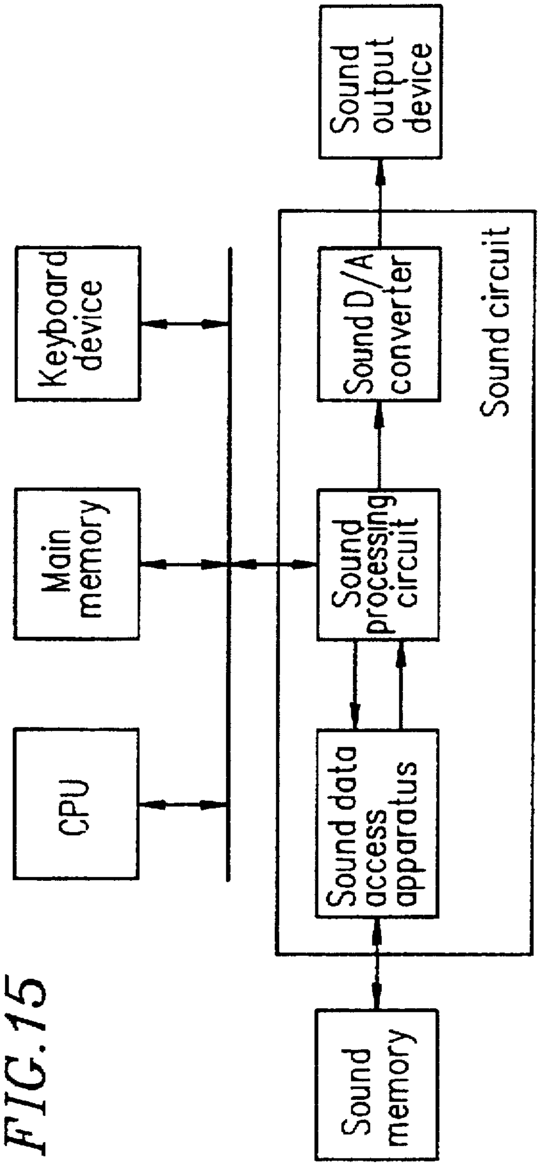
FIG. 15 is a block diagram showing the configuration of an electronic musical instrument in a fifth example according to the invention.
Figure 16:
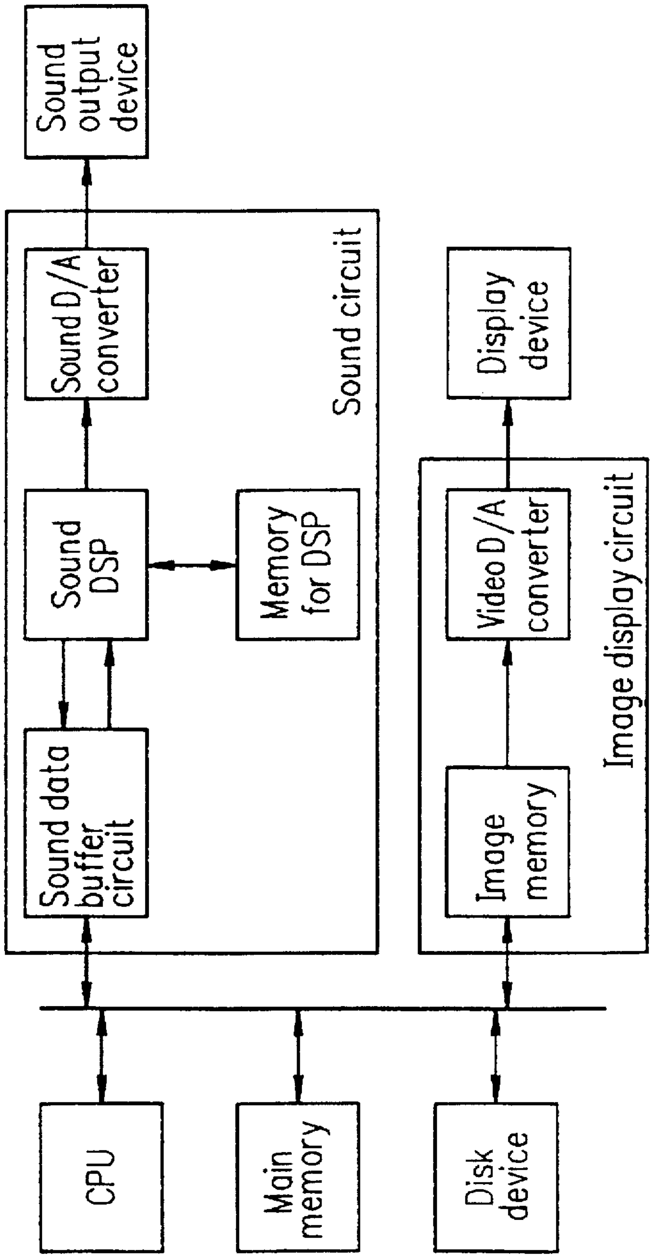
FIG. 16 is a block diagram showing the configuration of a conventional multi-media personal computer.

FIG. 15 is a block diagram showing the configuration of the electronic piano.

The electronic piano of this example includes a CPU, a main memory, a keyboard device, a sound memory, a sound circuit, and a sound output device. The CPU controls the whole of the electronic piano system, and controls the sound circuit. The main memory stores system control programs for the electronic piano, as required. The keyboard device detects the kinds of keys depressed by a player, the depressing strength, or the depressed time, and sends the obtained information to the CPU. The sound memory stores previously sampled sound data such as data obtained by sampling the sounds of piano or guitar. The sound memory is constructed with a ROM or the like. The sound circuit includes a sound data access apparatus, a sound processing circuit, and a sound D/A converter.

The sound data access apparatus reads sound data from the sound memory in accordance with the instructions from the sound processing circuit. The read sound data is processed by musical interval conversion or sampling rate conversion, and then the sound data is output to the sound processing circuit. The sound processing circuit executes the programs such as addition of effective sound and reverberation, or performs the sound processing which is determined by the hardware. The sound D/A converter converts the digital sound data into analog data at a predetermined sampling rate. The sound output device outputs the analog sounds. The sound output device is constructed with a loudspeaker, or the like.

Next, an exemplary case in which, when a key is depressed, a reverberation is added to the sound corresponding to the key, and the generated sound is output from the output device will be described.

The CPU detects the kind of depressed key of the keyboard device, and sets the musical interval (herein, 400 Hz), the strength and the duration to be output in the sound processing circuit.

The sound processing circuit instructs the sound data access apparatus to read the sound data to be output. If the data of the specified musical interval is not stored in the sound memory, the sound processing circuit instructs the sound data access apparatus to read a set of samples of sound data among the sound data held in the sound memory (herein the sound of 500 Hz), and to perform the musical interval conversion.

The sound data access apparatus reads the sound data of 500 Hz from the sound memory. The musical interval is converted into 400 Hz, and then the sound data is output to the sound processing circuit.

In the sound processing circuit, the sound processing for adding reverberation is performed. The sound data is output to the sound D/A converter. The converted sound is output from the sound output device.

By constructing the electronic piano as described above, even if the samples of all sounds in the musical scale are not stored in the sound memory, sounds in a required musical interval range can be reproduced by performing musical interval conversion as required.

In addition, the processing of musical interval conversion is performed by the sound data access apparatus, so that the load of the sound processing circuit is reduced.

In this example, the electronic piano is described. Alternatively, various electronic musical instruments can be realized by holding sound data obtained by sampling the sounds of various musical instruments. The input device for inputting play data is not limited to the keyboard device.

In this example, there is no possibility for delay in the reading of data from the sound memory, so that the sound data access apparatus may be a circuit described in any one of the first to third examples.

According to the above-described examples of the invention, the following effects can be attained:

(1) The versatile processing of musical interval conversion and sampling rate conversion can be performed simultaneously with the memory access, so that the load of the CPU or DSP which conventionally performs the conversion processing can be reduced.

(2) The prediction by extrapolation can be performed, so that it is unnecessary to provide a buffer memory for compensating for the memory access delay.

(3) The processing of musical interval conversion and sampling rate conversion and the processing of prediction by interpolation in the case where a delay occurs in sound memory access can be implemented in a single piece of hardware.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A sound data access apparatus comprising:

a sound memory for storing sound data which is sampled and digitized, for receiving a sound address signal, and for outputting sound data stored at an address indicated by the sound address signal, as a sound data signal;

timing generating means for generating an access timing at which the sound memory is to be accessed, for outputting a sound access timing signal indicating the access timing, for outputting a sound interpolation timing signal having a rate obtained by multiplying the rate of the sound access timing signal by a real number, for generating an output timing at which a sound is to be output, and for outputting a sound output timing signal indicating the output timing;

address generating means for receiving the sound access timing signal, for generating an address used for reading the sound data from the sound memory in a synchronous manner with the sound access timing signal, and for outputting a sound address signal indicating the address to the sound memory; and data interpolating and selecting means for receiving the sound interpolation timing signal, the sound output timing signal, and the sound data signal, and for outputting a sound output signal, wherein the data interpolating and selecting means includes:

an interpolating section for obtaining, by interpolation, sound data at a timing indicated by the sound interpolation timing signal by using at least two adjacent sound data signals, and a selecting section for outputting the sample of sound data as a sound output signal at a timing indicated by the sound output timing signal, and wherein the interpolating section includes a sound register for storing the sound data signal and for outputting data indicated by the sound data signal as an input sound signal;

a cumulative sound register for storing and holding an interpolated sound signal, and for outputting data indicated by the interpolated sound signal as a cumulative sound signal;

sound difference calculating means for obtaining a difference between the input sound signal and the cumulative sound signal and multiplying the difference by 1/n, n being a real number, and for outputting the resulting data as a sound difference signal; and accumulating means for receiving the sound difference signal, for obtaining an accumulation of sound difference data indicated by the sound difference signal, and for outputting the accumulated result as an interpolated sound signal, and wherein the selecting section includes an output register for storing the interpolated sound signal at a timing indicated by the sound output timing signal, and for outputting data indicated by the interpolated sound signal as the sound output signal.

2. A sound data access apparatus according to claim 1, wherein the sound memory additionally outputs a sound data effective signal indicating a timing at which the sound data signal is output, and the data interpolating and selecting means further receive the sound data effective signal, and read the sound data signal in a synchronous manner with the sound data effective signal.

3. A sound data access apparatus according to claim 1, wherein the data interpolating and selecting means obtains sound data at a timing indicated by the sound interpolation timing signal by using two adjacent samples of sound data, whereby the load of processing in an interpolation operation is reduced.

4. A sound data access apparatus according to claim 1, wherein the data interpolating and selecting means obtains sound data at a timing indicated by the sound interpolation timing signal by using three or more adjacent samples of sound data.

5. A sound data access apparatus according to claim 1, wherein the timing generating means outputs the sound interpolation timing signal having a rate obtained by multiplying the rate of the sound access timing signal by a power of 2, the power of 2 being represented as $2^m$, m being 1 or more, and the sound difference calculating means shifts the difference between the input sound signal and the cumulative sound signal to the right by m bits, so as to obtain a value multiplied by $1/(2^m)$, and outputs the result as the sound difference signal.

6. A sound data access apparatus according to claim 1, wherein the timing generating means generates a plurality of sound output timing signal series, and outputs a plurality of sound output signal series in a synchronous manner with the plurality of sound output timing signal series respectively.

7. A sound data access apparatus according to claim 6, wherein the data interpolating and selecting means includes a plurality of selecting sections which to the plurality of sound output timing signal series respectively, whereby the plurality of sound output signal series can be simultaneously generated.

8. A sound data access apparatus according to claim 6, wherein the data interpolating and selecting means includes a plurality of interpolating sections and a plurality of selecting sections corresponding to the plurality of the sound output timing signal series, whereby the plurality of sound output signal series can be simultaneously generated.

9. A sound data access apparatus according to claim 1, further comprising a plurality of output storage means, wherein the data interpolating and selecting means outputting a plurality of sound outputting signal series by performing time-sharing processing, the timing generating means output a plurality of output stored timing signal series, each of the plurality of the output storage means for receiving the sound output signal and output stored timing signal which correspond to the output stored means respectively, for storing the sound output signal, and for outputting the stored sound output signal in a synchronous manner with the output stored timing signal.

10. A sound data access apparatus comprising:

a sound memory for storing sound data which is sampled and digitized, for receiving a sound address signal, and for outputting sound data stored at an address indicated by the sound address signal, as a sound data signal;

timing generating means for generating an access timing at which the sound memory is to be accessed, for outputting a sound access timing signal indicating the access timing, for outputting a sound interpolation timing signal having a rate obtained by multiplying the rate of the sound access timing signal by a real number, for generating an output timing at which a sound is to be output, and for outputting a sound output timing signal indicating the output timing;

address generating means for receiving the sound access timing signal, for generating an address used for reading the sound data from the sound memory in a synchronous manner with the sound access timing signal, and for outputting a sound address signal indicating the address to the sound memory; and data interpolating and selecting means for receiving the sound interpolation timing signal, the sound output timing signal, and the sound data signal, and for outputting a sound output signal, wherein the data interpolating and selecting means includes:

an interpolating section for obtaining, by interpolation, sound data at a timing indicated by the sound interpolation timing signal by using at least two adjacent sound data signals, and a selecting section for outputting the sample of sound data as a sound output signal at a timing indicated by the sound output timing signal, the sound memory additionally outputs a sound data effective signal indicating a timing at which the sound data signal is output, and the data interpolating and selecting means further receive the sound data effective signal, and read the sound data signal in a synchronous manner with the sound data effective signal, wherein the interpolating section includes:

a sound register for storing the sound data signal at a timing indicated by the sound data effective signal and for outputting data indicated by the sound data signal as an input sound signal;

a cumulative sound register for storing at a timing indicated by the sound data effective signal and holding an interpolated sound signal, and for outputting data indicated by the interpolated sound signal as a cumulative sound signal;

sound difference calculating means for obtaining a difference between the input sound signal and the cumulative sound signal and multiplying the difference by 1/n, n being a real number, and for outputting the resulting data as a sound difference signal; and accumulating means for receiving the sound difference signal, for obtaining an accumulation of sound difference data indicated by the sound difference signal, and for outputting the accumulated result as an interpolated sound signal, and wherein the selecting section includes:

an output register for storing the interpolated sound signal at a timing indicated by the sound output timing signal, and for outputting data indicated by the interpolated sound signal as the sound output signal.

11. A sound data access apparatus according to claim 10, wherein the timing generating means outputs the sound interpolation timing signal having a rate obtained by multiplying a rate of the sound access timing signal by a power of 2, the power of 2 being represented as $2^m$, m being 1 or more, and the sound difference calculating means shifts the difference between the input sound signal and the cumulative sound signal to the right by m bits, so as to obtain a value multiplied by $1/(2^m)$, and outputs the result as the sound difference signal.

12. A data sample series interpolating apparatus comprising:

interpolating means for interpolating a received first data sample series, so as to generate a second data sample series with sampling intervals which are more narrow than those of the first data sample series, and for outputting the second data sample series;

selecting means for receiving the second data sample series, for selecting data sample with predetermined sampling intervals from the second data sample series, and for outputting the selected data sample as a third data sample series, wherein the interpolating means interpolate the received first data sample series by using two adjacent data samples, obtaining a data sample of the second data sample series continuously, when a data sample of the first data sample series for interpolation can not be received at the necessary timing, the interpolating means extrapolate by using two adjacent data samples previously obtained, whereby the second data sample series can be output without a delay.

13. A data sample series interpolating apparatus according to claim 12, wherein the sampling intervals of the second data sample series are equal to each other.

14. A data sample series interpolating apparatus according to claim 12, wherein the sampling intervals of the second data sample series are real multiple of the sampling intervals of the first data sample series.

15. A data sample series interpolating apparatus according to claim 12, wherein the selecting means includes a plurality of selecting sections, each of the selecting sections generating the third data sample series from the second data sample series.

16. A data sample series interpolating apparatus according to claim 12, wherein a plurality of third data sample series are generated from the second data sample series, by performing time-sharing processing in the interpolating means and the selecting means.

17. A data sample series access apparatus comprising:

a memory storing a first data sample series, receiving an address signal, outputting a data sample stored at an address indicated by the address signal;

address generating means for generating and outputting the address signal;

timing generating means for generating and outputting an access timing signal indicating a timing at which the memory is to be accessed, an interpolation timing signal indicating a timing at which an interpolation operation is to be performed, and a data output timing signal for selecting data from interpolated data; and data interpolating and selecting means for receiving the first data sample series from the memory, for performing an interpolation operation of the first data sample series in a synchronous manner with the interpolation timing signal, so as to generate a second data sample series, and for selecting the second data sample series in a synchronous manner with the data output timing signal, so as to output the selected data as a third data sample series, wherein the memory outputs a timing for outputting a data sample as a data sample effective signal, the data interpolating and selecting means receives the data sample effective signal so that whether a delay occurs or not in an access to the memory can be detected, and even when a delay occurs, performing an extrapolation operation using the data sample of the first data sample series previously obtained, whereby outputting the second data sample series without a delay.

18. A data sample series interpolating method comprising the steps of:

interpolating an input first data sample series, so as to generate a second data sample series having sampling intervals which are narrower than those of the first data sample series, and outputting the second data sample series; and receiving the second data sample series, and selecting a data sample at predetermined sampling intervals from the second data sample series, so as to output the selected data sample as a third data sample series wherein the step of interpolating comprises the step of interpolating the input first data sample series by using two adjacent data samples, obtaining a data sample of the second data sample series continuously, when a data sample of the first data sample series for interpolation can not be received at the necessary timing, extrapolating by using two adjacent data samples previously obtained, whereby the second data sample series can be output without a delay.

* * * * *